United States Patent
Dettmer et al.

[11] Patent Number: 5,812,732
[45] Date of Patent: Sep. 22, 1998

[54] METHOD AND APPARATUS FOR THE CLASSIFICATION OF TELEVISION SIGNALS

[75] Inventors: Thomas Dettmer, Dortmund; Bernd Reusch, Herdecke; Michael Wittner, Dortmund, all of Germany

[73] Assignee: Deutsche Thomson-Brandt GmbH, Villingen-Schwenningen, Germany

[21] Appl. No.: 620,870

[22] Filed: Mar. 22, 1996

[30] Foreign Application Priority Data

Mar. 30, 1995 [DE] Germany .................. 195 11 618.6

[51] Int. Cl.$^6$ ............................ H04N 5/94; H04N 7/00
[52] U.S. Cl. ............................ 386/48; 348/460
[58] Field of Search .................. 348/5, 907, 460, 348/461, 468, 478, 465, 473, 474; 386/46, 48, 83; H04N 5/94, 7/00

[56] References Cited

U.S. PATENT DOCUMENTS 5,253,061  10/1993  Takahama et al. .................. 386/83
5,343,251   8/1994  Nafeh .................................. 348/571

FOREIGN PATENT DOCUMENTS 4208932  4/1993  Germany .

OTHER PUBLICATIONS

Copy of German Search Report.

*Primary Examiner*—Robert Chevalier
*Attorney, Agent, or Firm*—Joseph S. Tripoli; Frederick A. Wein; Francis A. Davenport

[57] ABSTRACT

The invention relates to the classification of such parts of television signals which are commercials so that those parts can be eliminated during recording or playback. Known methods for the detection of commercials during a TV program suffer from the drawbacks that one or two features of the TV signals are observed to decide whether the TV signal is part of a commercial or not. In the present invention of a method and apparatus, a classification of TV signals results on a plurality of information gathered from the TV signals and a plurality of rules using a rule system. Such a rule system permits the modeling of uncertainties so that for the definition of the rules, no strict values or strict limits need be given. In particular, fuzzy rules and linguistic variables are used.

22 Claims, 13 Drawing Sheets

| FIG. 5A |
|---|
| FIG. 5B |

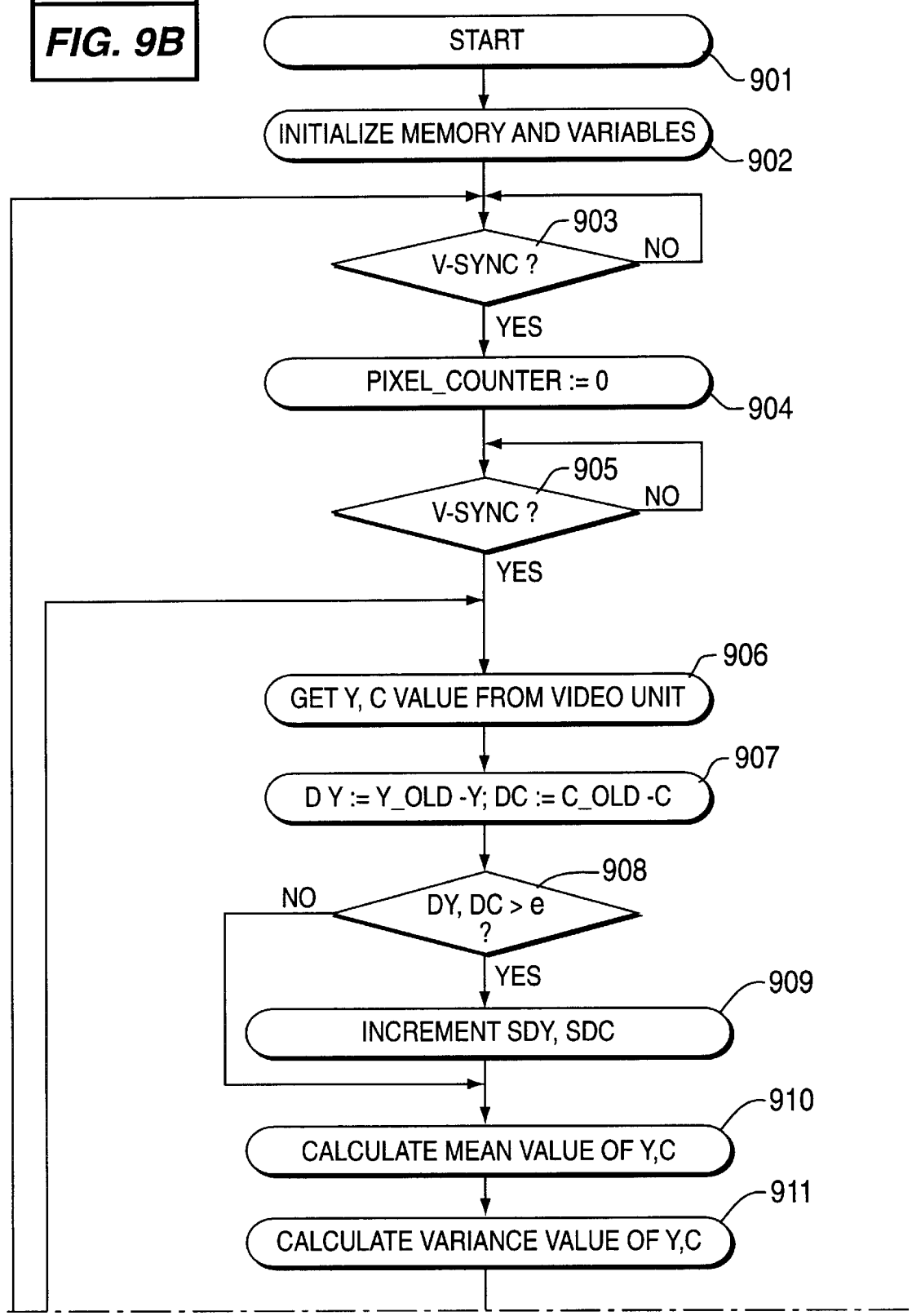

METHOD AND APPARATUS FOR THE CLASSIFICATION OF TELEVISION SIGNALS

BACKGROUND

The invention relates to a method and an apparatus for the classification of television signals, in particular to the classification of such parts of a television signal which are commercials so that those parts can be eliminated during a recording or playback procedure.

With recording systems for TV signals, for example video recorders, it is possible to record TV programs automatically. If such a TV program comprises commercials, then those commercials will be recorded along with the program if no countermeasures are taken. But normally those commercials are not interesting for the user during subsequent viewing of the recorded material. If he uses a usual recording system, it is possible to use fast forward scanning to reach the end of commercials within a short time. This manual skipping of the unwanted commercials is, however, not very satisfactory for the user.

To overcome this drawback, it is either possible to eliminate such commercials during the recording process or to skip those parts automatically during playback mode. It is then necessary to provide a method which can differentiate safely between program parts and commercial parts of a TV program. If such a decision can be made with a technical system, then it is possible to control either the recording or the playback of recorded programs.

Some methods are already known for automatic differentiation between different contents (for example commercials and real programs) in TV signals. But all the known methods suffer from the drawback that one or two features (sometimes called events) only are observed to decide whether the TV signal is part of a commercial or not.

From the USA, methods are known in which decisions are made on the basis of the appearance of black images, wherein a black image comprises only pixels of the same color and brightness value. Normally "black" is used as color value, but different values like "blue" could be observed. It can be decided on the basis of simple statistical calculations on all color and brightness values of an image if such an image fulfils the above criteria of a black image. Further it can be observed that before and after a commercial, some black images are broadcast, and that commercials normally do not exceed a particular duration (normally 30 s). These observations are the basis of the methods described in the PCT application No. WO081/00945 of Johnson and Koobes, U.S. Pat. No. 4,750,025 of Poppy and Samelson for controlling the recording of TV signals, and in U.S. Pat. No. 5,333,091 of Iggulden and McFarland for controlling the playback of recorded television signals. The method of U.S. Pat. No. 5,333,091 uses moreover the observations that commercials normally do run for less than a certain minimum length and that subsequent commercials have a minimum duration.

The method of Blum described in U.S. Pat. No. 5,151,788 uses the observation that images in commercials show a high activity. If such an activity can be detected directly after a black image then the following TV signals are judged as being commercials and the recording is stopped until the next black image.

Except for the method of U.S. Pat. No. 5,333,091 all of the above methods try to come to a classification in real time. If with those methods commercials are detected, then the recording will be stopped. A wrong classification can therefore lead to the loss of relevant information. However, in the method of U.S. Pat. No. 5,333,091 the occurrence of black images during recording is only registered. Subsequently, the collected information is analyzed and from the time intervals between black images the classification is performed as to whether a commercial has occurred. This information is then used for controlling the playback of recorded material.

In Germany, a further method has been developed which indicates that the TV signal is part of a commercial if no logogram (in short logo) is inserted in the image. Further, in Germany, the individual broadcasters are obliged to make a clear distinction between program content and commercials via video and audio information. This is normally achieved by inserting a characteristic logogram during the program content in the picture and fading this logogram out during a commercial. In practice, however, this rule is not observed. It could be observed that in programs of state-owned television no logogram was inserted during the broadcast of program content. During sport programs with short commercials the logogram was sometimes not faded out during commercials or not faded in after a commercial.

To sum up, all the above methods only work as long as the observed features do really appear in the expected form and situation. If it comes to deviations, it is possible that commercials are not detected or that the program content is misclassified as commercials. For example, some video clips or experimental movies are edited like commercials so that the occurrence of black images as in commercials is possible.

With the receivable broadcasters in Germany a plurality of such situations could be observed, in which the above methods do not work. Common to all known methods is that they only take a few features into account and follow a rigid scheme. But in reality, no such rigid scheme exists, which can be applied to all situations.

SUMMARY OF THE INVENTION

It is therefore an object of the present invention to provide a method and an apparatus for the classification of television signals, in particular the classification of commercials, which provides reliable results for the classication of commercials.

According to the invention the method for the classification of television signals comprises the following steps:

Defining a set of detectable features, each being characteristic of a property of said television signals;

Assigning a variable with a predetermined domain of arguments to each detectable feature;

Defining a predetermined functional domain for each detectable feature on said domain of arguments;

Defining a set of rule using said variables, wherein the evaluation of said set of rules results in a classification of said television signals;

Measuring said variables in said television signals for a pretermined time, and evaluating said rules using the measurement values of said variables to classify the content of the television signals.

Preferably said classification results are used for the detection of commercials in TV signals and the classification is performed on a framewise basis. But a fieldwise classification is possible.

Said detectable features are derived from the audio and the video parts of the television signals, wherein the following audio features are used for the definition of the variables: stereotone and two channel audio. The stereotone feature is subdivided into stereotone indication via pilot signal, stereotone indication via VPS signal, and stereotone indication via level difference. Further the two channel audio is subdivided into two channel indication via pilot signal, two channel indication via VPS signal, and two channel indication via level difference.

The following features of the video signals can be analyzed with image processing: distribution of brightness in one frame, color variance in one frame, measure of the difference of two successive frames used for logogram detection, use of VPS information, use of VPS break signal, and use of VPS code.

The variables used for the classification are linguistic variables. Preverabbly the set of variables is a fuzzy set, and fuzzy logic is used in the evaluation of the set of rules. Functions are defined on said variables and in general, the functional domain is formed by the interval [0,1], but other intervals or sets can be used if appropriate. The interval [0,1] is often used because of its correspondence to the probability concept.

To achieve a fast evaluation of said set of rules the functions defined on the domain of arguments are preverably trapezoidal functions including triangles and rectangles.

For the evaluation of the set of rules, the area and the momentum of the above functions are multiplied by the fuzzy value of the condition, wherein the area and the momentum of the function are computed besed on said trapezoidal functions.

Preverably the set of rules according to Appendix B and the linguistic variables according to appendix A are used.

It is possible that the classification is based on the knowledge of present and past television signals only, i.e. the classification is performed in real time.

Another possibility is that the knowledge of future television signals is also used for the evaluation of the set of rules, i.e., the classification is done using a recorded television signal.

Further, the classification results can be stored in memory for future use.

Further, a threshold value s can be defined so that if the probability of the occurrence of a commercial is smaller than s, the data of the last 60 s are stored; if the probability of the occurrence of the commercial is greater or equal to the threshold, the data are continuously stored until the occurrence of the commercial is smaller than the threshold for 90 s.

The values of the color variance, brightness variance, audio level and logogram similarity are compared at the start and the end of a data block. Further the time intervals between the black images are detected in a data block of the television signals for the evaluation of the start and the end of a commercial.

The above mentioned features of the method according to the invention are used in an apparatus for the classification of television signals.

Such an apparatus comprises preferably three microcontrollers, a data bus and a memory, wherein the central controller executes the operating system, the second controller executes image processing software and the third controller processes the fuzzy rules. The apparatus further comprises a video unit and an image memory which is connected to the video unit and the second controller with a fast image data bus. If VPS signals are used for the classification, the apparatus further comprises a VPS decoder. Further, it comprises a sound decoder, a digital signal processor connected to said sound decoder for the analysis of the audio signal.

Two principal modes of operation are possible, first the apparatus can detect the commercials during a recording operation so that the commercials can be suppressed, i.e., real time recording, and second the apparatus can detect commercials during the playback mode and suppresses their display on a TV screen.

Further the apparatus can detect commercials during a copying operation and suppress the commercials in the copying mode.

To sum up, the present invention bases on a method, in which a classification of TV signals results on a plurality of information gathered from the TV signals and a plurality of rules using a rule system. Such a rule system permits the modelling of uncertainities so that for the definition of the rules no strict values or strict limits have to be given.

With the method according to the invention a system can be realized, which detects the start and the end of commercials in TV programs automatically, which will be called in the following as commercial detection system (CDS). The automatic controlling of a recording, playback or copying of TV signals is now possible, wherein commercials are either not recorded, skipped during playback or not copied.

If such a classification result of the CDS is necessary directly, for example, while controlling the recording of TV signals, this is called a real time analysis. During a real time analysis only information of the present and past can be taken into consideration. If a classification decision can be done to a later time, future information can be considered for the decision. Because in this case more information can be used, such a procedure is more precise than a real time analysis. In this case information of a TV signal can be collected first until a safe classification is possible. The classification results are then stored and used for controlling the next playback of the analyzed material.

A preferred embodiment of the method and the apparatus according to the invention will now be described with reference to the accompanying drawings, in which:

DESCRIPTION OF THE PREFERRED EMBODIMENT(s)

To begin with, fuzzy rules are introduced with which a classification of TV programs, in particular in Germany, are possible with the present constraints. With fuzzy rules and fuzzy sets, it is possible to model fuzzy expressions as for example, the expression "commercials are normally 30 s long". For the conversion of fuzzy expressions in fuzzy rules and the definition of fuzzy sets, there do not exist strictly defined rules. Therefore it is possible that the present method works with amended rules and sets. Especially the rules have to be changed in countries with other terms for the broadcasting of TV signals. But with the use of such rules it is possible to take different schemes of the broadcasting of commercials into account. With such a modelling of fuzzy expressions with the use of rules it is still possible to detect commercials if deviations of the normal scheme occur.

Figure 1:
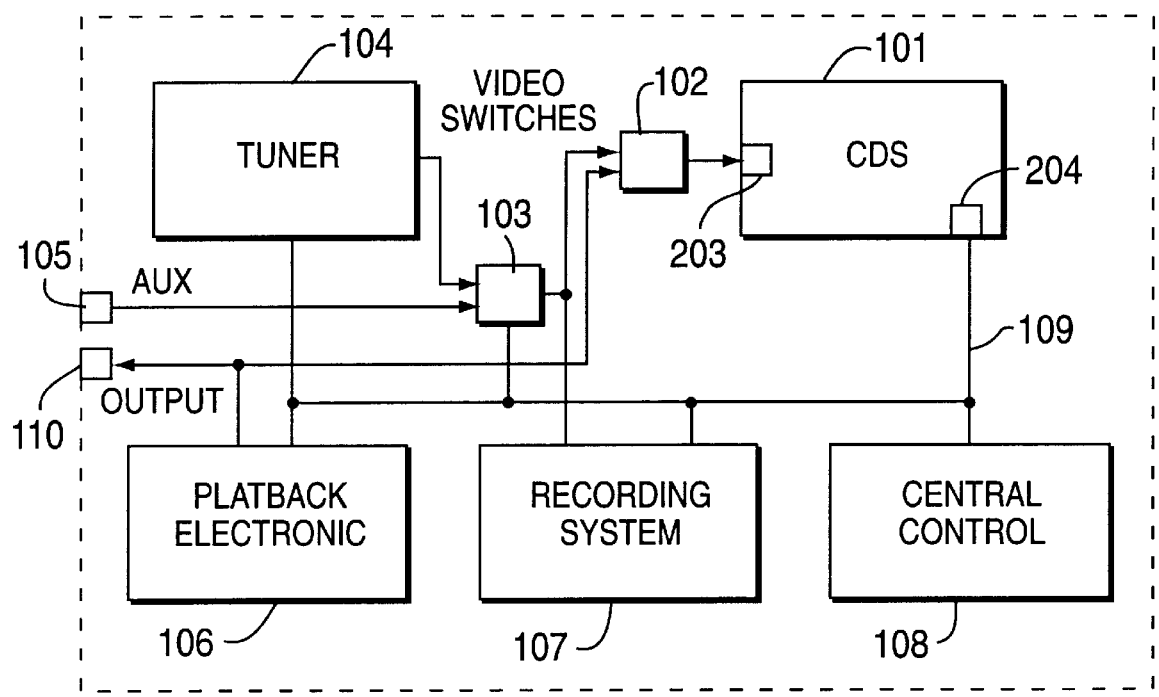
FIG. 1 shows the embedding of CDS in a television and video recording system.

FIG. 1 shows the embedding of a CDS as an integral part of a video recorder for TV signals for a TV system. The CDS 101 has two external terminals 201, 204 wherein the terminal 203 is used for imputting a TV signal in the CDS 101. In this case, the type of signal is of no importance. In particular, the signal can be analogue or digital, audio and video information can be separate, the video information (image) can also be separated in brightness and color information (YUV or YC). All these types are convertible to each other through known technical systems. For the sake of simplicity, in the following description it is assumed that the video information is an FBAS signal and the audio information is an uncoded NF signal. The second terminal 204 is a digital terminal connected to the recording apparatus. The exact type of this terminal is a function of the intended use. For example buses can be connected. Therefore, the terminal 204 can be connected to an internal control bus or the editing interface of a VCR. Further, an IR transmitter/receiver can be connected. With this terminal 204, the CDS can send commands to the recording system or receive information from it. In more detail, either an input signal 105 the signal of a tuner 104, or the signal of a playback electronic 106 can be connected via two video switches 102, 103 to the input terminal 203 of the CDS 101. With a control bus 109 the CDS 101 is connected via terminal 204 to the central control 108 of the system. The other components, i.e. the tuner 104, the playback system 106 and the recording system 107, are also connected to the central control bus 109.

Figure 2:
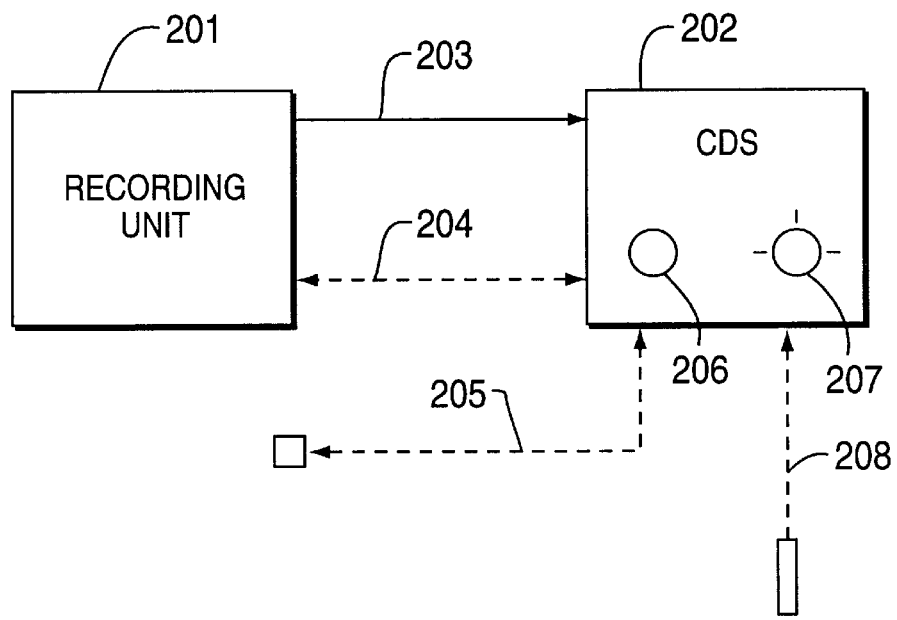
FIG. 2 shows the CDS as a stand alone system.

FIG. 2 shows a CDS 201 as an external apparatus. With the terminal 203, the video and audio information to be classified is transferred from the recording unit 201 to the external CDS 202. If the recording unit 201 has a control interface, the recording unit 201 can be connected to the CDS 202 via the control terminal 204 so that information and commands can be exchanged. If the recording unit 201 is not equipped with such a control interface, it should be possible that the CDS 202 sends commands via an IR transmitter 205 to the recording unit 201. If the CDS 202 cannot be activated from the recording unit 201, the CDS 202 has to be equipped with an operating element 206. Further, a second operating element 207 for the setting of the mode (real time analysis, normal analysis, playback) can be identified by the user. Further, a barcode reader 208 is connected to the CDS 202.

On the one hand, the CDS 101, 202 is able to classify a television signal directly, in other words, in real time. In this case the CDS can 1. control the recording of TV signals in such a way that commercials are not recorded, 2. mark those locations on the data medium, where commercials have been detected, during the recording of TV signals, and 3. fade out the image and tone during the playback of actual broadcast or recorded commercials.

On the other hand, if the information as to which parts of a TV program are commercials and which parts are TV program content, is needed at a later time, it is possible that this information is stored in relation to the recorded material. In this case the CDS 101, 202 can delay the decision of a classification until enough information has been extracted from the TV signals. During the playback of recorded material with units, which are able to use this additional information, it is impossible to skip those parts which have been detected as commercial. Further, the copying of recorded material with commercials to a copy without commercials can be made automatically.

Therefore, the following preconditions for the technical realization of the CDS must be fulfilled.

1. The CDS must be able to acquire knowledge about the start and the end of a recording phase. Further, the CDS must be able to control the recording function of the recording apparatus.

2. The recording unit must be able to record additional information on the recording material. Further, it must be possible that the CDS is informed about the start and the end of a recording phase and the CDS must be able to control the functions of the recording unit for this additional information.

3. The CDS must be able to control the functions of the information playback system for the skipping of video and audio information.

4. The storing of position information about locations of programs recorded on the data carrier in relation to the data carrier must be possible in such a way, that a playback system can automatically retrieve those locations on the data carrier. The relation of the stored positions to the respective data carrier, on which the respective program has been recorded, must be satisfied. This is easiest, if absolute positions of the carrier are stored on the carrier system itself. This is possible, if an index area exists on the data carrier or the data carrier system comprises a separate memory unit for storing the position information.

If such a possibility does not exist, either the data carrier itself can be supplied afterwards with this additional information which are necessary for controlling an automatic playback.

If no direct position information can be stored on the carrier system or no positions can be marked on the carrier, the position information must be stored permanently in the recording system or the CDS itself. In this case it is necessary to distinguish between single data carriers. A method for achieving such a differentiation is disclosed in U.S. Pat. No. 5,333,091. Another possibility is to supply the data carrier with a barcode. Such a barcode could be automatically read with respective units if the data carrier system is introduced in the recording unit or the barcode must be read via a separate barcode reader.

The following information must be fed to the CDS:

1. The CDS must be supplied with a signal containing the relevant information, i.e., a television signal, 2. The CDS must know when to start and to stop with the classification of the supplied signals, and 3. The CDS must convert the classification results in control signals.

The above mentioned constraints are for example fulfilled in the arrangements according to the FIGS. 1 and 2.

Figure 3:
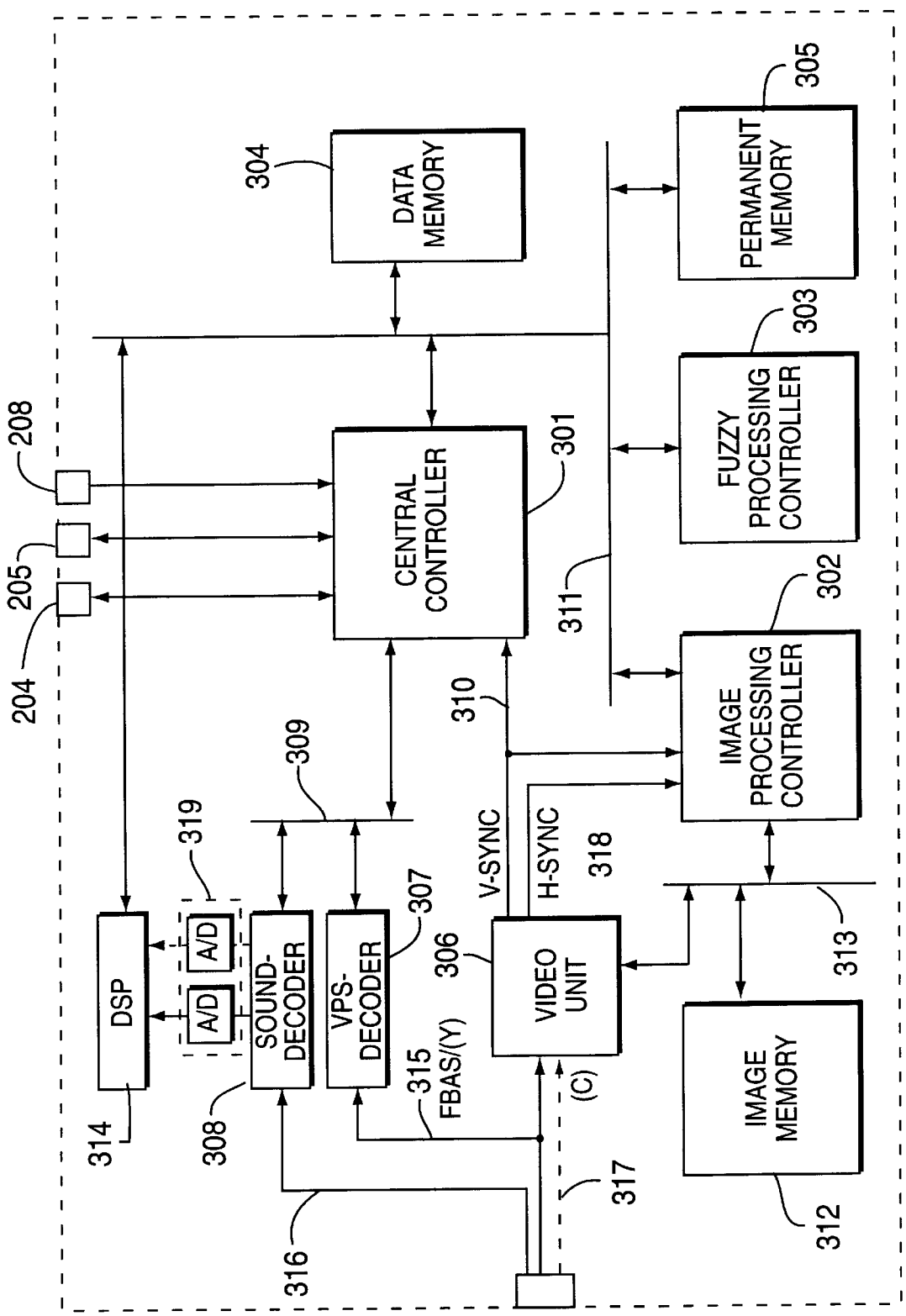
FIG. 3 shows a schematic of the CDS circuit.

FIG. 3 shows a possible realization of a commercial detection system according to the invention. The CDS comprises three microcontrollers 301, 302 and 303. The central controller 301 processes the operating system. The second controller 302 is used for special image processing objects. The third controller 303 had an optimized architecture for the processing of fuzzy rules. The three controllers communicate via a data bus 311. A data memory 304 serves for the storing of temporary data. In contrast thereto, memory 305 is a permanent memory, which saves the information even in the event of power down. The memory 305 is needed, for example, for the storing of position information. The controllers 301 and 302 have an internal program memory. Further, the fuzzy controller 303 comprises an internal memory for the fuzzy sets and rules. A memory 312 serves as a fast memory for image data. Via an image data bus 313, the image processor 302 communicates with the image memory 312 and the video unit 306. Via an external terminal 203, video and audio signals are provided to the system. The video signal can be in the form of a FBAS signal or in the form of a Y/C signal. Via the connection 315 the FBAS signal or the Y part is supplied to the video unit 306 and a VPS decoder 307. The C part is provided via the connection 317 to the video unit 306.

The audio signals are sent via a connector 316 to the audio decoder 308. The audio decoder 308 separates the audio signal into two channels. After the digitisation through two R/D converter 319, the audio signal is supplied to a digital signal processing unit 314.

The video unit 306 digitizes the video signal, decodes the color information and separates the sync signals 310 and 318. The digitized image information is supplied via a bus 313 to the image processor 302. The vertical sync signal 310 is supplied to controller 301 and to controller 302, whereas the horizontal sync signal is only needed by controller 302.

The VPS decoder 307 extracts the VPS information out of the image signal. Further, the sound decoder 308 evaluates, whether the audio signal is of type "mono", "stereo" or "two channel audio". The respective information of the two decoders 307, 308 is supplied via the control bus 309 to central controller 301.

The external terminals 204, 205 and 208 for the control interface, the IR receiver/transmitter and the barcode reader are directly connected to I/O ports of the central controller 301.

Figure 4:
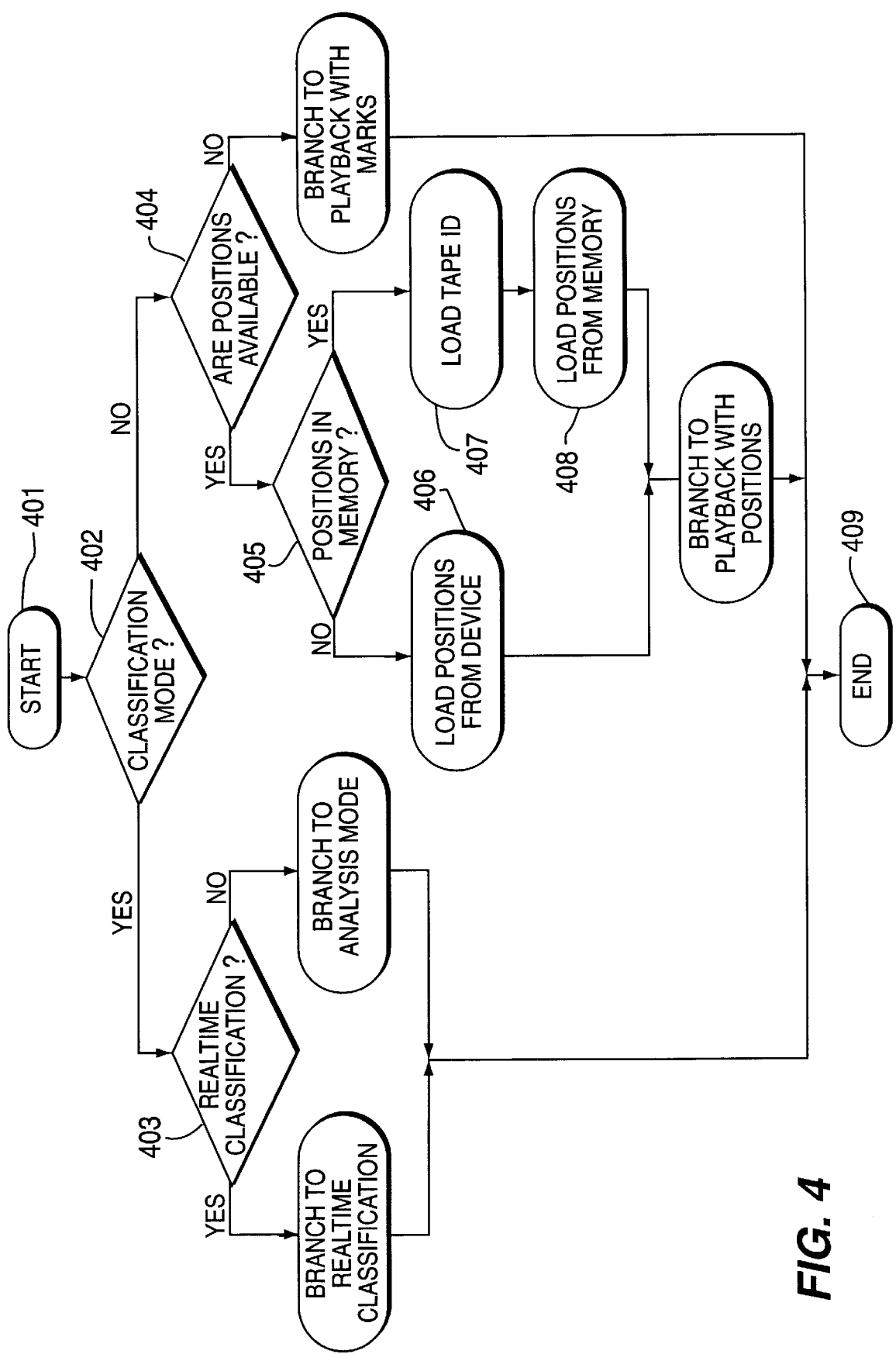
FIG. 4 shows the control routine of such a CDS.

FIG. 4 shows a flow chart of the control routine of a CDS. In this control routine the branching to all possible operation modes is shown.

The control routine starts in step 401, when a data carrier is put into a recording system, the CDS is activated and the user manually sets the recording unit in the playback or recording mode, or, if the recording unit or CDS is put in the recording mode via the routine.

With a user action either directly at the CDS or indirect through the recording unit, it is set in step 402 if the CDS is branched to the classification mode or to the playback mode. In step 403 it is decided if the routine should branch to a real time classification or branch to an analysis mode. The setting of the type of analysis is done through user interaction.

Steps 404 and 405 branches to subroutines depending on the features if the data carrier system is able to store position information or if the position information has to be stored in the system itself. If the position information is stored internally, step 405 branches to step 407, if not, to step 406.

In step 406 the position information is read from the data carrier.

In step 407 the mark of the data carrier is read and in step 408 the respective position information is read out from permanent memory 305. After steps 406 or 408 the program branches to respective subroutines.

After possessing of the respective subroutines, the control program is terminated in step 409.

Figures 5, 5A:
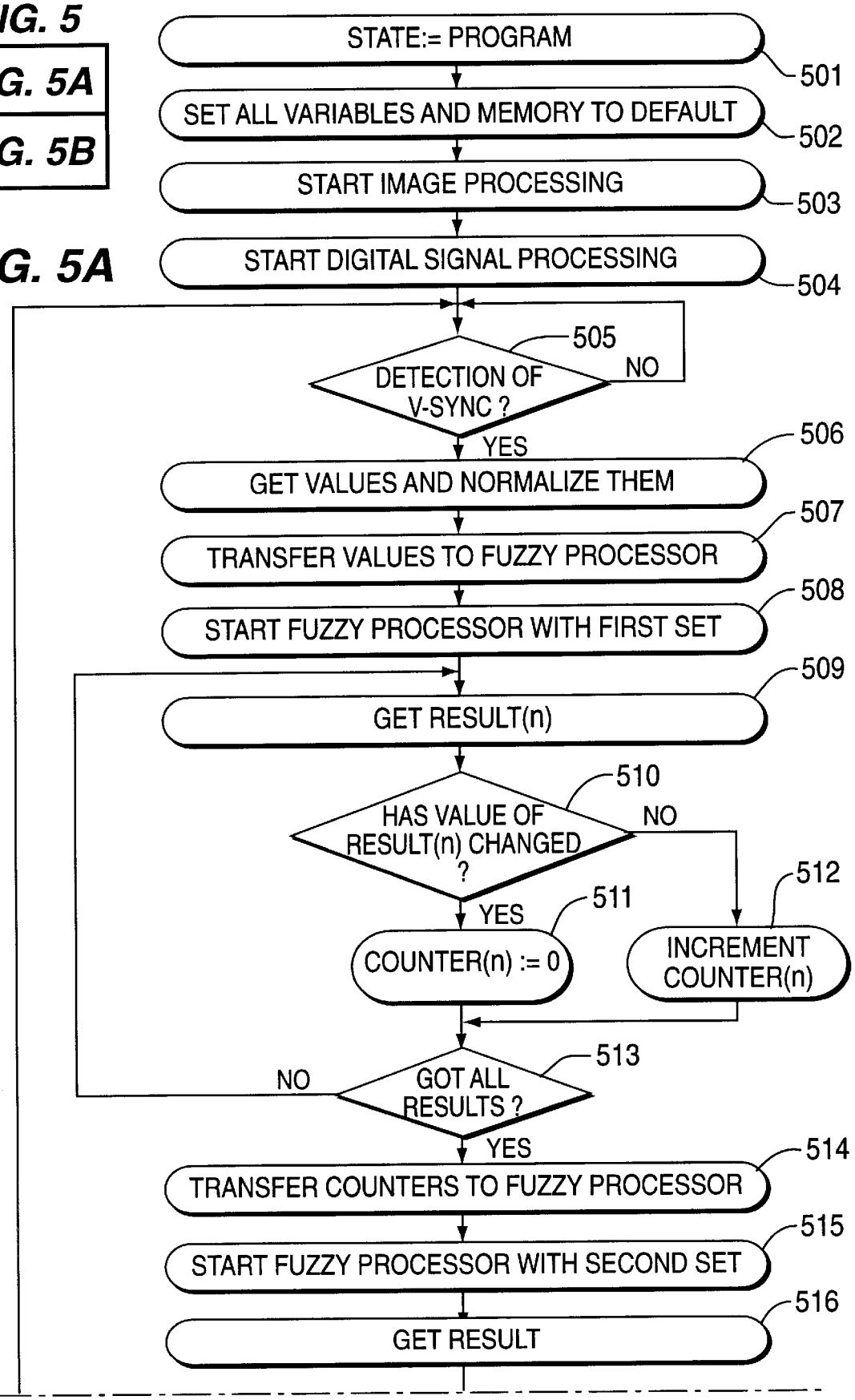
FIGS. 5a and b show a flow chart of the routine "real time analysis"
Figure 5B:
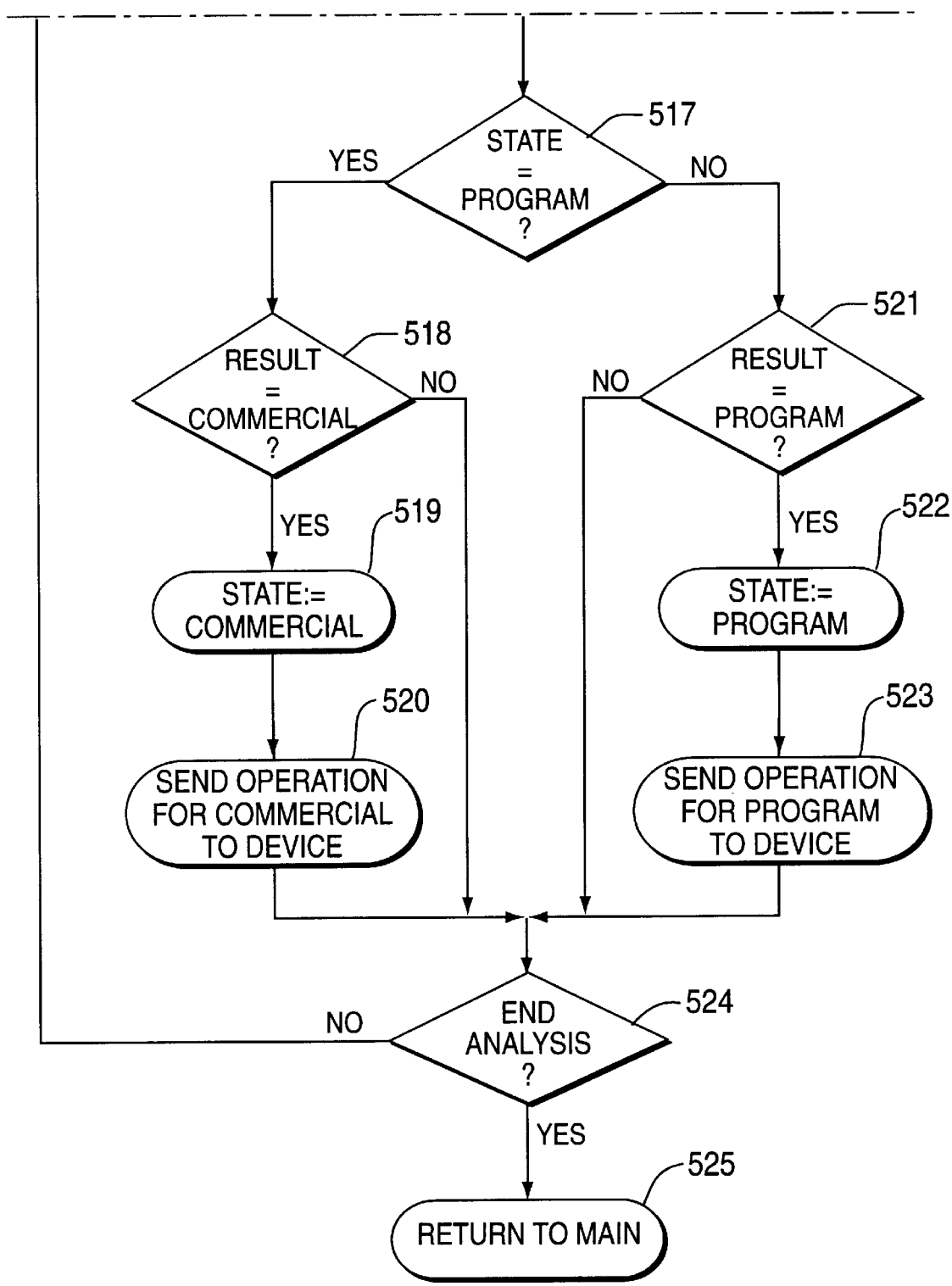

FIG. 5 shows a flow chart of the routine "real time analysis" shown in FIG. 4. To initialize, the class is set to "program" in step 501, the counters for all features are set to 0 and the states of all features are set to the initial values in step 502. The image processor and the digital single processor for the audio analysis are started in step 503 and 504, respectively.

The routine waits in step 505 for the registration of the next vertical sync pulse and in step 506 receives all actual values of the evaluation units 302, 307, 308 and 314 and makes a normalization if necessary.

The normalized values are written in step 507 into the fuzzy processor 303. The fuzzy processor 303 is started in step 508 with the first set of rules (see appendix B).

If the evaluation in the fuzzy processor 303 is terminated, the results are fetched in step 509. Each of those results represents the state of a feature. If the state of a feature has changed because of the new results, which is questioned in step 510, then a respective counter is set to 0 and the new state of this feature is stored in step 511. Otherwise the counter is incremented by one in step 512.

In step 513 the routine inquires if all results are read. The new stage and counter values of all features are written into the fuzzy processor in step 514.

In step 515 the fuzzy processor 303 is started with the second set of rules (see appendix B) and the results are transferred to the main processor in step 516. If the class has been set to "program", the routine proceeds with step 518, otherwise with step 521. This inquiry is performed in step 517.

If the actual result of the fuzzy processor 303 is "commercial" in step 518, then the class is set to "commercial" in step 519. Then in step 520 the command operation for the start of a commercial is sent via the control interfaces 204, 205 to the recording unit. If the result of the fuzzy processor in step 518 is "no commercial" then the routine directly proceeds to step 524. If a class change from "commercial" to "program" has taken place in step 521, then the class is set to "program" in step 522 and the command for the operation concerning the end of commercial is sent to the recording unit in step 523. In step 524 it is inquired, whether the analysis has to be terminated, which is the case if a respective command of the recording unit is present. In this case the program returns in step 525 to the main routine. Otherwise the routine returns to step 505.

Figures 6, 6A, 6B:
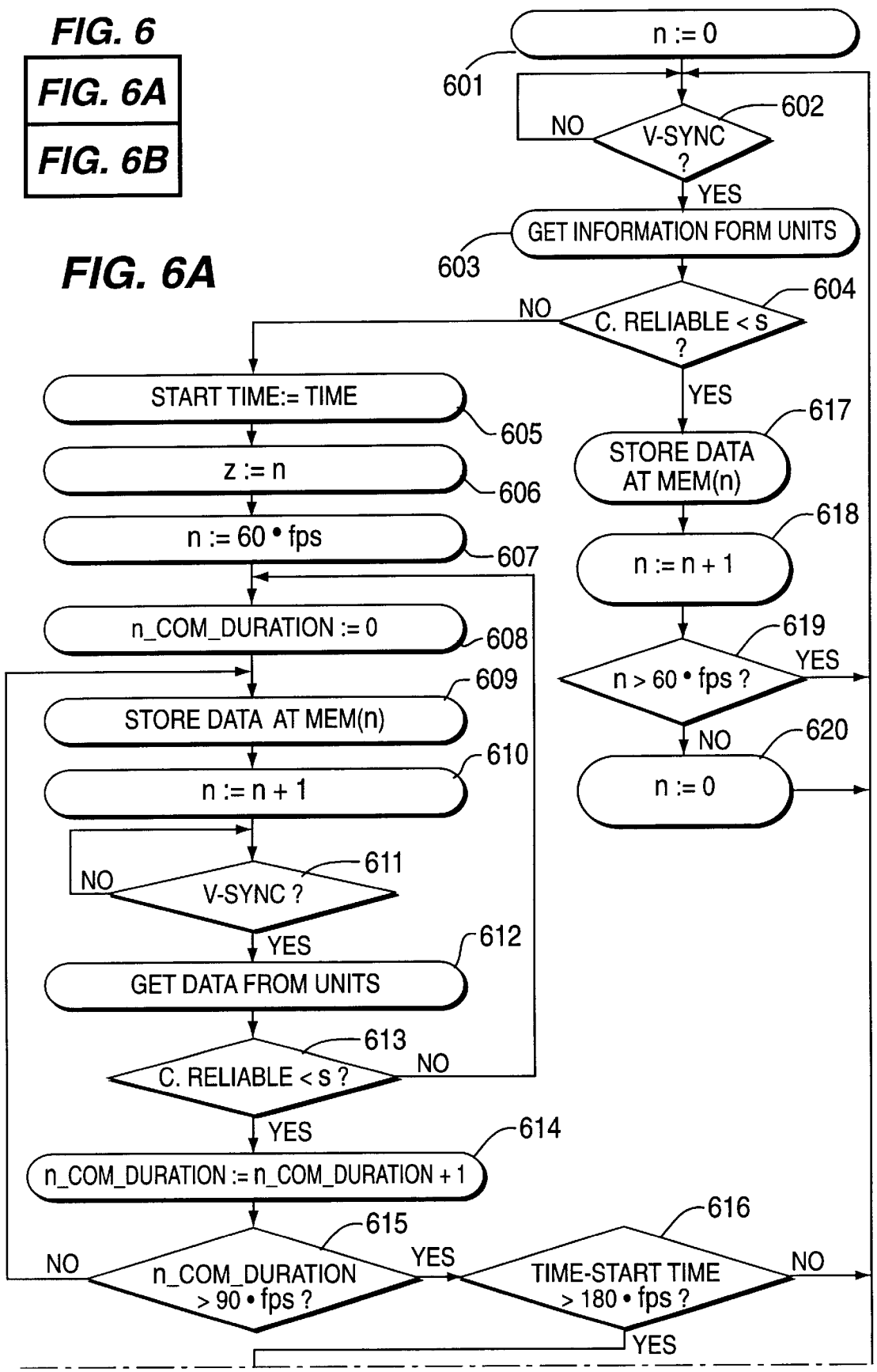
FIGS. 6a and b show a flow chart of the routine "precise analysis"
Figure 6B:
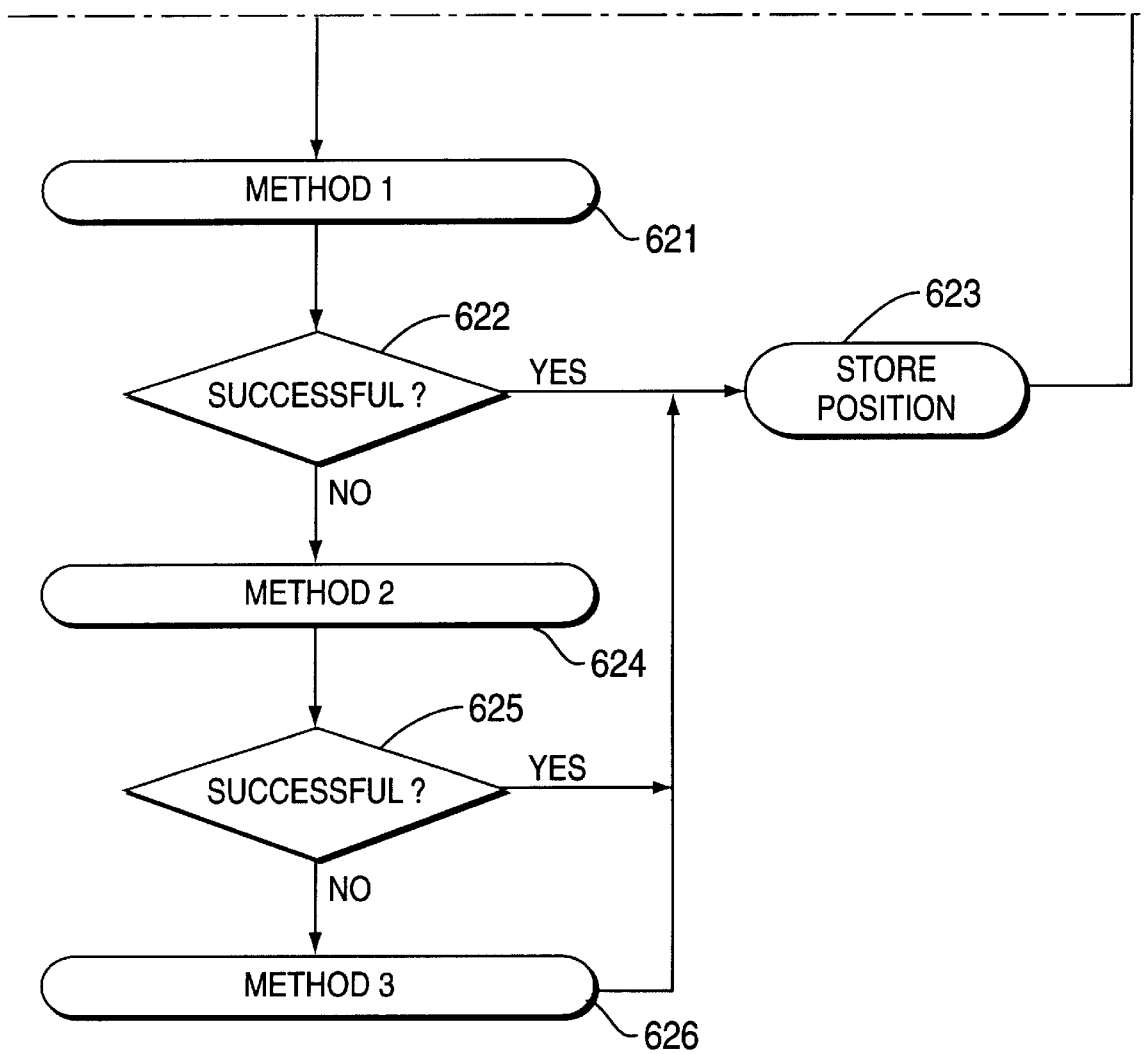

The FIGS. 6a and 6b show a flow chart of the routine "precise analysis".

In the routine "real time analysis" according to FIGS. 6a and b the content of a television signal is decided as being a commercial only if the fuzzy processor outputs the class "commercial" with 100% probability. The reason for this is that it must be avoided that parts of a program, which are not commercials, are eliminated. But on the other hand, it is therefore more probable that a commercial is classified as being program content. In particular, this happens at the start and the end of commercial breaks. To achieve better results in cases in which no real time classification is necessary, the outputs of the fuzzy processor are stored and subsequently analyzed. To further validate the analysis results, part of the information of the television signals are recorded. For this method a threshold s is defined. As long as the variable commercials.reliable<s, the data of the last 60 s are stored. If commercials.reliable·s, the data are stored continuously. If afterwards it is registered that commercials.reliable<s for 90 s, the storing of data is stopped and the stored data are analyzed. This information is again skipped, if the time interval between which the first and last time the feature commercial.reliable·s has occurred is smaller than 90 s. For each data block the values of commercials.reliable, time information, brightness value, brightness variance, color variance, value for the logogram similarity and the mean audio level are stored.

Color variance, brightness variance, and logogram similarity of the respective values are compared in this order at the start and end of each data block. If similarities exist, it is searched as long in the direction towards the middle of the data block starting from both sides until significant deviations have occurred. These positions are recorded for each type of information. If 50% of the positions found in this manner are located before and after the middle of the data block in an interval of maximum 30 s, it is assumed that the start and end of the commercial is here. If exactly one image cut or one black image can be found in or adjacent to the interval, then this position is chosen as start or end of a commercial interrupt (called in FIG. 6b as "method 1").

If method 1 is not successful, then the time intervals of the black images in the data block are evaluated. If 80% of the time intervals of two neighboring black images are dividable by 5 and at least 30 and at most 60 s long, then the positions of the first and the last black image in this sequence are taken as the start and the end of a commercial (called in FIG. 6b as "method 2".)

If method 2 is not successful, then the real time algorithm will be used (called in FIG. 6b "method 3" in step 626). It can happen that a recording already starts when a commercial block is broadcast before a TV program and, on the other hand, that the recording stops after the real end of the TV program. This can be recognized if approximately 30–60 s after the start of the recording or the end of the variable recording commercial.reliable>s. The first method for the analysis can in such cases only be used on one side.

The routine stores a sequence of positions. Each position indicates a location of the recording, where a change from "commercial" to "program" or vice versa is assumed. To note during the playback which class is set at first, this information has to be stored as well. Normally this is the class "program". Only if within the first 30–60 s commercial.reliable>s is for at least 90 s, then the class "commercial" will be stored. The above described routine is depicted in the flow chart of the FIGS. 6a and 6b with the sequence of steps 601–626.

Figure 7:
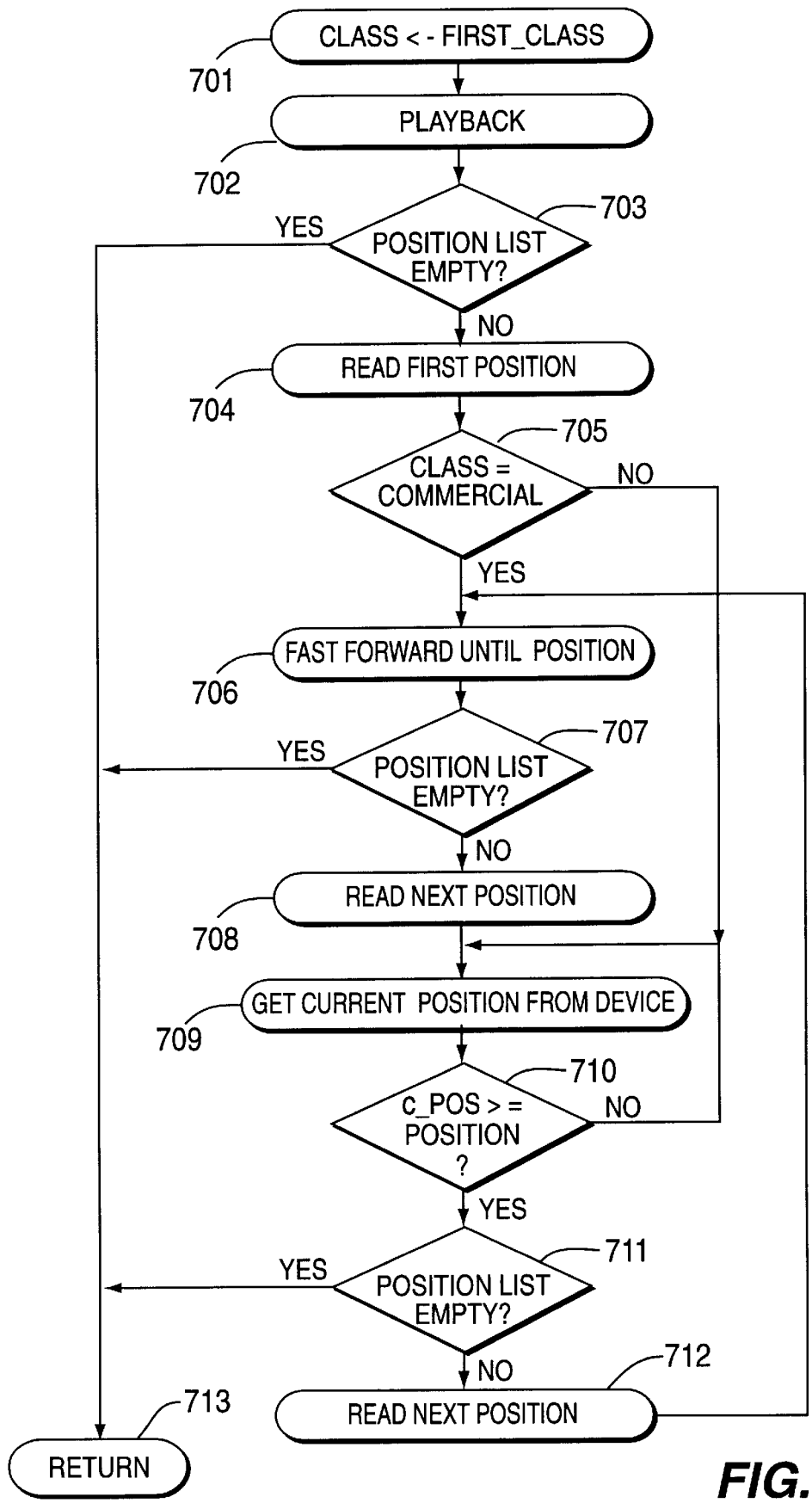
FIG. 7 shows a flow chart of the routine "playback with positions"

FIG. 7 shows the flow chart of the subroutine "playback mode with stored position information". In step 701 the value of the class for the start of the recording is read from the memory. The playback is started in step 702. In step 703 it is inquired whether the position list in the memory is empty or not. Is this not the case, then the first position value is read from memory. If the list is empty, then it is branched to step 713, as is the case for inquiry 707 and 711, to terminate the subprogram. The inquiry in step 705 questions whether at the start of the recording the class is commercial. If this is the case, then the tape is wound fast forward until the first position in step 706. Otherwise, the program branches to step 709. In step 708 the next position value is read out from memory, wherein it is first questioned in step 707 whether the list is empty or not.

The actual position value is read from the recording unit in step 709, which is repeated in inquiry 710 until the actual position value is greater or equal to the position value from the memory. Once again it is inquired whether the position list is empty or not (step 711). If the list is not empty then the next position is read in step 712 and the routine returns to step 706. If the position list is empty, then the routine branches to step 713 and returns to the main routine.

Figure 8:
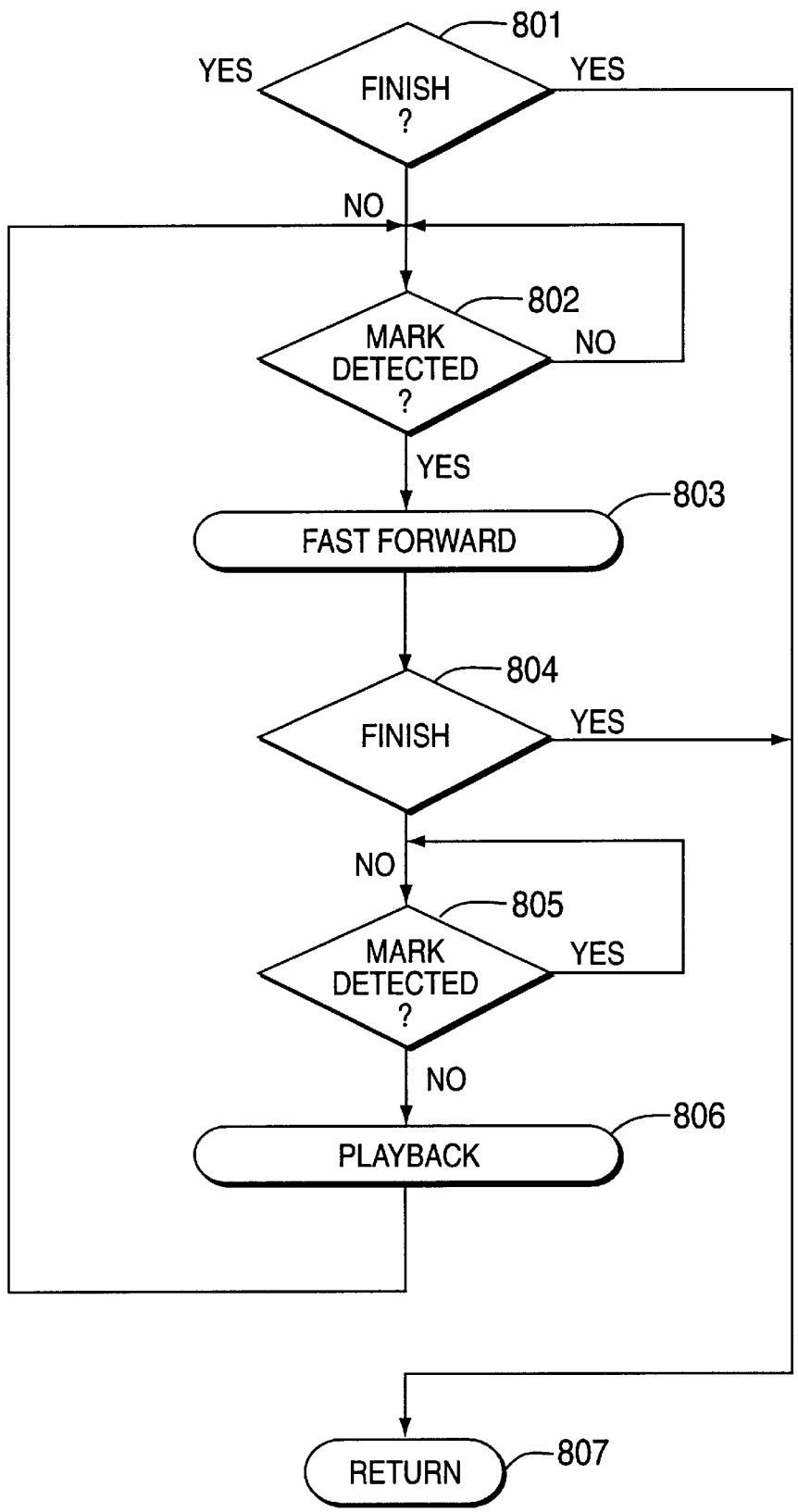
FIG. 8 shows a flow chart of the program "playback with marks"

FIG. 8 depicts a flow chart of a subroutine "playback of a recording with marked locations".

In steps 801 and 804 it is questioned, whether the playback was terminated by a user interaction. If this is the case the routine branches to step 807 for the termination of this subroutine, otherwise the routine proceeds to the next step. In step 802 the routine waits until a mark has been recognized, so that in step 803 the recording unit is switched to fast forward wind. In step 805 the routine waits until marks are not recognized any longer, so that in step 806 the recording medium is switched back to playback. Then the routine proceeds with step 802.

Figure 9B:
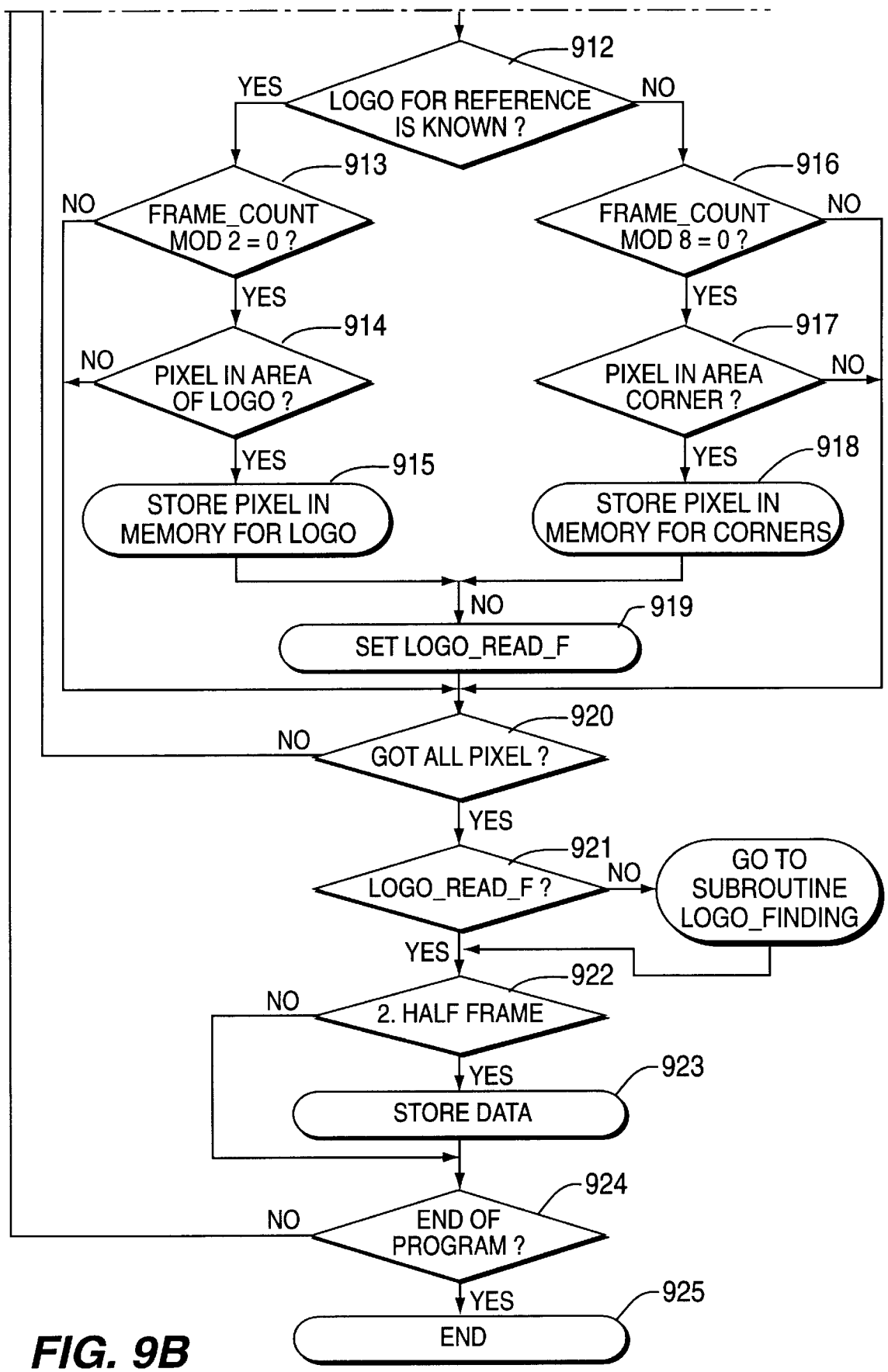
FIGS. 9a and b show a flow chart of the video analysis.
Figure 10A:
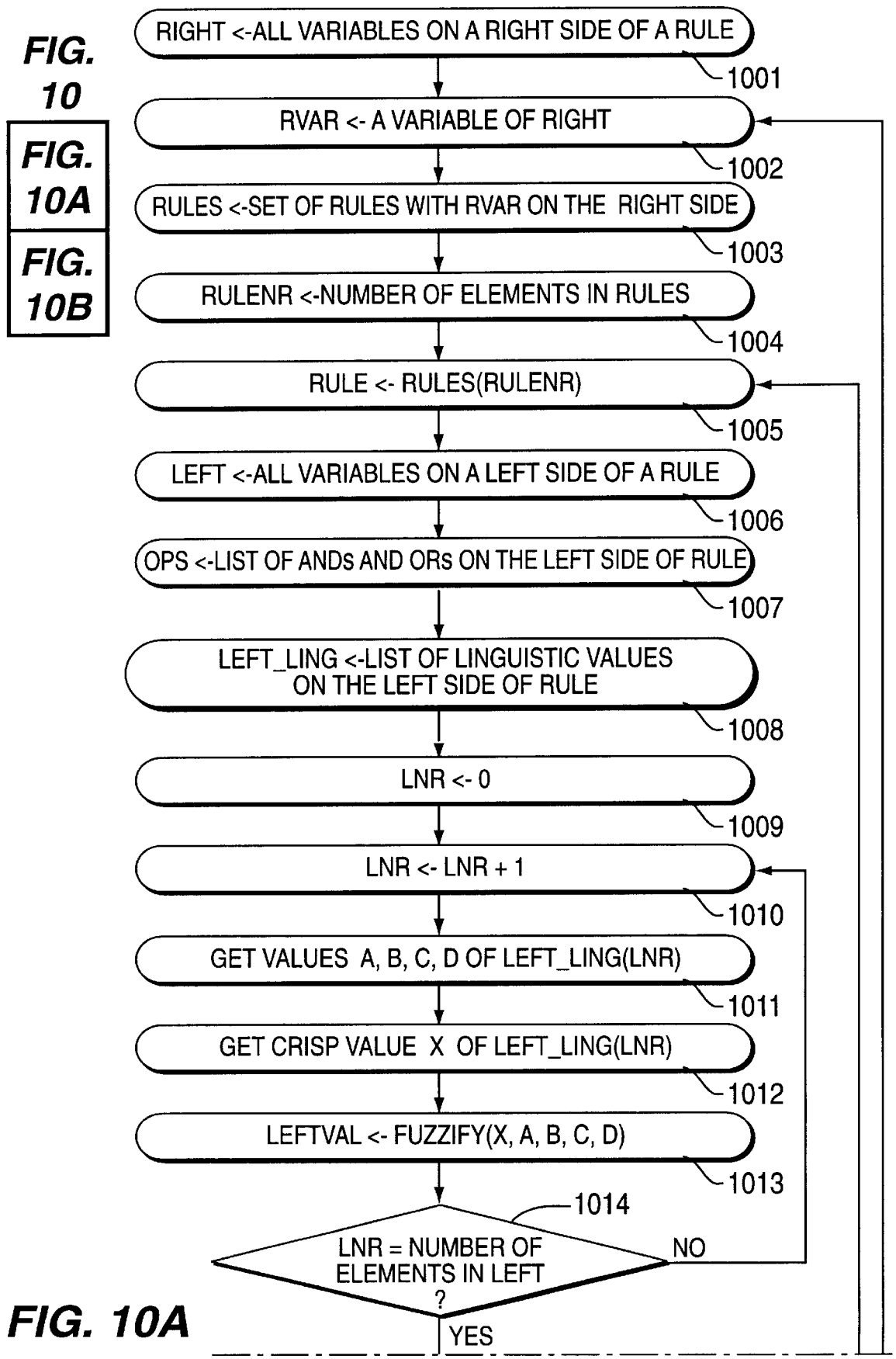
FIGS. 10a and b show a flow chart of the fuzzy algorithm.
Figure 10B:
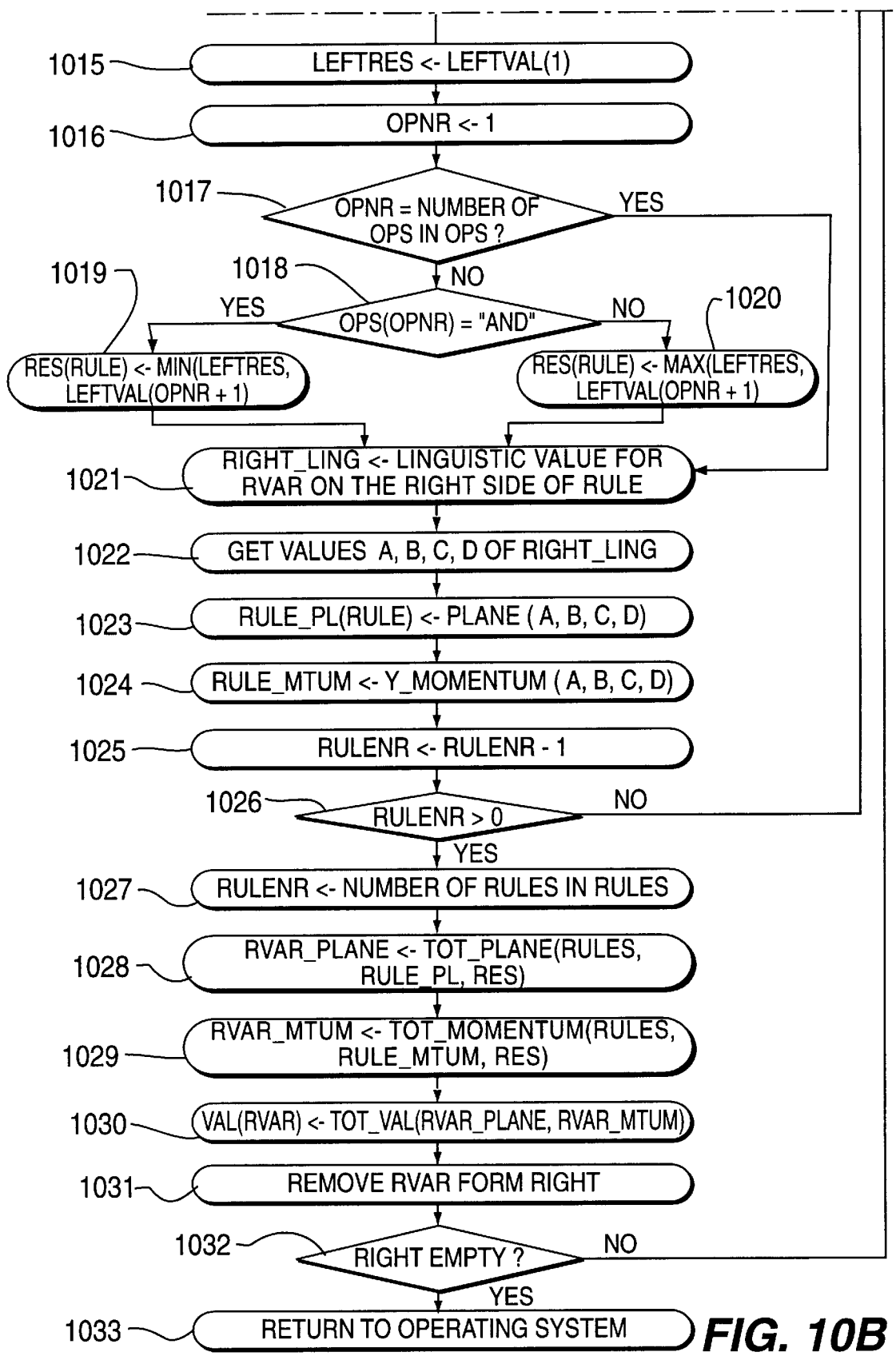

For FIGS. 9 and 10a and 10b it is necessary to explain briefly which information of a TV signal is important for an automatic detection of commercials, how the information can be measured, how this information is related to features in regards of fuzzy sets and fuzzy rules, and which rules and sets can be used for the classification.

It has to be kept in mind that this information is related to the broadcasting scheme in Germany. In other regions or countries other broadcasting schemes are used, so that a modification of the set of extractable information has to be adapted accordingly.

A TV signal normally comprises video and audio information, which can be separated into image signals and audio signals. Depending on the broadcaster, binary information is modulated onto the image signal at locations which are not visible on the screen. This digital information is used for the transmission of video text and/or VPS information. With known circuits this information can be extracted as additional signals. Further an audio signal can be modulated in such a way that two audio channels can be transmitted. In this way either a left and right channel of a stereotone or two different languages (two channel audio) can be transmitted. But only a few broadcasters use this possibility. If the television signal is received from a satellite then different language channels are transmitted normally on different audio carrier frequencies and are not coded on one single carrier frequency. Further, a pilot signal in the audio signal determines whether the tone is of the type "mono", "stereo" or "two channel". With a sound decoder the audio signal can be separated in two channels. Such decoders usually comprise signal terminals or memory locations where the information of the type of audio can be extracted.

The following information can be used, for example in Germany, for the automatic detection of commercials:

1. Stereotone

In Germany commercial spots are often broadcast with stereotone. If a broadcaster has the possibility to broadcast stereotone and the actual program content is not broadcast with stereotone, then the occurrence of stereotone is a safe indication for a commercial.

Two possibilities exist for determining automatically whether a stereotone or not is present.

1.1 Stereotone indication via a pilot signal

The sound decoder 308 can determine whether the pilot signal shows the type of audio "stereo". The function for the interrogation of the sound decoder is:

Stereotone_pilot, value: 0,1, is 0, if the sound decoder indicates stereotone, otherwise 1.

1.2 Stereotone indication via VPS signal.

The specification of the VPS signal allows for transmission of information of the actual type of the simultaneously broadcast audio signal. To get this information, the VPS decoder 307 is tested. The function: stereotone_VPS, output value: 0,1, indicates 0 whether the VPS decoder indicates stereotone, otherwise 1.

1.3 Stereotone indication via level difference

With the pilot tone, as with the VPS signal, it may happen that the tone type "stereo" is indicated, even if the real audio type is "mono". Therefore, a comparison of the two audio channels is done additionally. Only if both channels clearly differ from one another, then stereo information is present. The comparison is done with a subtraction of the signals of both audio channels, which is realized in DSP 314. If the result is clearly different from 0,then both channels are different. The result of the subtraction is extracted from the DSP 314 with the following function:

Channel_difference, output value: [0,1], giving °L–R° normalized to the interval [0,1], wherein L=left audio channel, R=right audio channel.

Some sound decoders directly deliver L–R. In this case the additional signal processor 314 is not needed.

2. Two channel audio

In Germany, commercials are normally not broadcast in two channel audio. If the actual program content is broadcast in two channel audio and during this broadcasting there are positions which are not broadcast with two channel audio then those parts are definitely commercials.

There exist two possibilities to automatically detect whether an audio signal is of the form "two channel".

2.1 Two channel audio indication via pilot signal

The sound decoder 308 can determine whether the pilot signal shows the information "two channel". The function for the inquiry of the sound decoder: two_channel_pilot, output value 0,1, results in 0 if the sound decoder indicates two channel audio, otherwise 1.

2.2 Two channel audio indication via VPS signal

The specification of the VPS signal allows for transmission of the information of the actual type of the simultaneous by broadcast audio signal. To get this information the VPS decoder 307 is interrogated. The function therefore:

Two_channel_VPS, output value: 0,1, results in 0, if the VPS decoder indicates two channel audio, otherwise one.

2.3 Two channel audio indication via level difference

As in item 1.3 it is possible that either with the pilot tone or the VPS signal the audio form "two channel" is erroneously indicated, even if the audio form is in reality "mono". Therefore, additionally, a comparison of both audio channels is performed. The comparison is done with subtraction of the signals of both audio channels in the processor 314. If the result differs clearly from 0 then both channels are different. The function for this is:

Channel_difference, output value: [0,1]

which delivers °L–R° normalized to the interval [0,1], wherein L=left audio channel, R=right audio channel.

3. Sound level

In Germany, according to the law, commercials and program content have to differ in the audio signal. This is normally done by increasing the audio level (sound level) during the commercial. Therefore, before and after commercials and during commercials there are normally sound breaks to recognize. Sound breaks can be detected automatically, if the audio level is near the minimal level value. Constant level increases or level decreases can be detected with first differentiation of the audio level after a low path filtering. The audio level and its first derivation are computed in DSP 314. The following functions are used:

Sound_level, output level: [0,1], which delivers the mean dB value of both audio channels normalized to the interval [0,1], and Sound_level_deriv, output value: [–1,1], which delivers the mean first derivative of the low path filtered sound level of both channels normalized to the interval [–1,1].

4. Image analysis 4.1 Brightness distribution in an image

The brightness distribution of an image or frame indicates the content or the "activity" of the image. Methods for the calculation of the brightness distribution are well known under the synomym "histogram". If the brightness of most of the pixel are concentrated around a certain brightness value then it can be concluded that the image only shows a small amount of optically different information. In this way image fade-outs can be recognized. It can be observed, that the image information is faded out before commercial interrupts and inserted again after commercial interrupts, wherein single commercial spots are separated directly with black images.

4.2 Color variance in one image

Before commercials there has to be a sequence of separating images perceptible to humans. Those separating images are normally man-made with a computer and only use a few colors. With the method according to 4.1 the color variance can be measured.

4.3 Measure of the difference of two successive images

With the sequences of separating images in 4.2, it can be observed that these sequences are either static or end in a static state after an initial movement. Static states can be detected with the difference of two successive images. If the amount of pixels in which two images differ is low, then there is no significant change in the image content.

4.4 Detection of logograms

As had already been mentioned, commercials and program content have to be optically different from each other in Germany. For this reason most of the broadcasters insert their logogram or a program specific logogram in one corner of the television screen. Normally this logogram is not inserted during a commercial. Because a logogram is a static image element, it can be determined by the comparison with subsequent images. Because the location of such logograms can vary slightly or some logograms are transparent, it is useful to perform an edge processing, for example with a gradient method. With known image processing techniques it is possible to detect a logogram within a few images. Because logograms are only present in corners of the image it is sufficient to apply the methods of logogram detection only in the corner regions of the images, so that computing time is shortened considerably. Further, it is necessary that the system learns a reference logogram, so that the system is not mistaken by product logograms during commercials. Therefore, it is tried at the start of a program to find a static structure in the above manner in an image corner, which is observed for a longer time span (approximately 1.5 min). During the further run of the routine it is checked whether the referenced structure is still present in the image via difference building. A change in similarity within a few images is interpreted as a fade-in or fade-out of the logogram.

FIG. 9 shows a flow chart of the routine "image analysis" executed in the image processor.

The video unit 306 digitizes and decodes the image information. For each pixel the image processor obtains a digital color and brightness value.

In step 901, the image analysis is started by the control processor 301. After the start, all memory regions, classes, states and variables are set to their initial values (step 902). Then in step 903 it is checked whether the first sync pulse is present. The pixel counter is set to 0 in step 904.

In step 904 the routine waits until the first visible pixel point is present, because information can only be extracted from visible parts of the image. Then in step 906 each pixel point is fetched sequentially from the digitizing unit.

The image just read is located in the image memory. The differences between the momentary values of the brightness and the color with the corresponding previous value are calculated in step 907. In steps 908 and 909 a counter is increased by 1 if these differences for the color and brightness value, respectively, are greater than 0 by a certain value.

Steps 910 and 911 sum up the color and brightness values, respectively, for one image and calculate the variance.

Every 8 frames, steps 912 and 916 to 918, the momentary pixel point is stored in a separate memory region, if this pixel point is located in a corner region and the routine is looking for the reference logogram.

In the phase in which the reference logogram is already known, those pixel points, which are in the region of the reference logogram, are written to a separate memory location. This happens every 20 images in the steps 912 and 913 to 915.

After reading of the first field of an image, the logogram information is evaluated, by branching to a subroutine in step 921, if this image does not overwrite the logogram memory.

If the first field is read in, then the routine branches directly to step 903 for the reading of the second field in step 923. Otherwise the determined values for the image difference, brightness distribution and brightness as well as color variance are stored and the variables initialized again.

During the phase in which the reference logogram has to be detected, the routine takes every 8th image only into account for time reasons. The detection of the logogram happens during such a time, in which no relevant image information is supplied by the video unit. The information deduced from an image is processed with a gradient filter and subsequently dilated. The values gained in such a way are processed according to the formula $$old\_value := (old\_value + new\_value)/2.$$

After ten runs of this method, the smallest surrounding rectangle around dark values present in the corners in the corner regions is determined. If such a rectangle with a sufficient size exists in exactly one corner, then it is assumed to be a logogram. If a couple of such rectangulars or no rectangular at all exists then the previous steps are repeated until exactly one rectangle is registered. If one of the determined rectangles is adjacent to the borders of those part just looked at, then this part is enlarged and the process repeated.

If at least one rectangular has been found then the variable logogram_similarity is set to 80% because it can be assumed that one of the structures represent the logogram searched for.

To further verify that the present rectangular comprises the logogram looked for, a comparison process is performed. For this reason a structure in the following images must be observed, which can be viewed as being identical with the alleged logogram. If this is not the case the process of finding a logogram is repeated.

In the logogram comparison process only information is analyzed which is present in the smallest surrounding rectangular of the reference logogram. After reading, this information is processed by a gradient filter and dilated. Then a comparison with the reference logogram is done and similar image pixels are counted. The parts in percent of similar image pixels is stored.

The following functions are used for the transmission of the relevant information from the image processor to the control processor:

Image_difference, output value: [0,1],
gives the parts in percent of differing image pixels of two subsequent frames, Brightness, output value: [0,1],
gives the mean brightness of a frame normalized to the interval [0,1], Brightness_variance, output value: [0,1],
gives the variance in percent of the brightness distribution of a full frame;

Color_variance, output value: [0,1],
gives the variance in parts percent of the color variance of a full frame;

Logogram difference, output value: [0,1],
gives the parts in percent of different image pixels of the edge-filtered reference logogram to the corresponding image portion of the momentary full frame.

5. Use of VPS information

If a broadcaster transmits VPS signals, then this information can be used additionally for the automatic detection of commercials.

5.1 VPS break mark

In the specification of the VPS signals it has been taken into account, that parts of a program, which do not belong to the actual program, are marked with VPS information. A recording unit can therefore interrupt the recording during those parts. Some broadcasters in Germany use this possibility for the marking of breaks by commercials. The following function can be used for the determination of this information from the VPS decoder 307:

VPS_break, output value: 0,1
gives 0, if the VPS decoder 307 displays interrupt code, otherwise 0.

5.2 VPS code

To make an automatic recording of programs possible, these programs are supplied during the transmission with unambiguous code. If this code changes, this is an indication about the start and end of a program. The following function fetches the momentary VPS code from the decoder 307:

VPS_code: output value: VPS_code,
gives the actual VPS code.

In the following, the steps 506 to 516 of the analysis method according to FIG. 1 are given in more detail, wherein it is assumed, that the information of the evaluation units are normalized as detailed above. In particular these are:

stereotone_pilot→{0,1}
stereotone_vps→{0,1}
two_channel_pilot→{0,1}
two_channel_vps→{0,1}
sound_level→[0,1]
sound_level_deriv→[-1,1]
channel_difference→[0,1]
image_difference→[0,1]
brightness→[0,1]
brightness_var→[0,1]
color_var→[0,1]
logogram_difference→[0,1]
vps_interrupt→{0,1}
vps_code→vps_code Apart from the actual value of these functions, the change of single values with time is interesting. For functions delivering discrete output values, it is determined, when the last value change had occurred. The time unit is defined as the time duration of the transmission of a full frame. For this reason the data type "frames" is introduced. A counter and a memory location is provided for each function wherein the value of the function in the previous frame is stored. When the new value of the function is known, this value is compared with the old value. If both are equal, the respective counter is increased by 1. Otherwise the counter is set to 0 and the new value is stored. To determine when the last value change occurred, the following functions are used:

stereotone_pilot_duration→frames
stereotone_$_{vps}$_duration→frames
two_channel_pilot_duration→frames
two_channel_vps_duration→frames
vps_break_duration→frames
vps_code_duration→frames For values which are not discrete, a single change in the value is not very significant, instead the direction of the change of value is of importance, i.e., the first derivative. For the audio signals this derivative is already generated in the evaluation unit. For the values concerning the image information, the derivative is calculated after each image with:

dw=(new value_old_value)

Because the time interval is exactly one image (frame), a division is not necessary. But for further processing only the direction of the derivative is interesting, i.e. whether the derivative is positive, negative or 0. The following three state values are defined:

deriv_pos:=dw>0+eps deriv_null:=°dw°<=0+eps deriv_neg:=dw<0-eps

The following functions are defined for the determination of the derivative state values:

Audio_level_deriv_$_{z→\{deriv\_}$pos, deriv_0, deriv_neg}
brightness_deriv_z→{deriv_pos, deriv_0, deriv_neg}
logogram_diff_deriv_z→{deriv_pos, deriv_0, deriv_neg}

Further, it is interesting for the last derivative values when the last change occurred. The following functions are used and the proceeding is analogue to the above one:

Audio_level_deriv_z_duration→frames
brightness_deriv_z_duration→frames
logogram_diff_deriv_z_duration→frames If all these values are present then it is for example possible to determine whether an image cut or an image fading did occur.

For most events their last occurence is of importance for the evaluation. If the evaluation of the first set of rules of the variables "logo_fade_in, logo_fade_out, sound_cut, black_image, image_break, image_fade-in, and image_fade-out" results in the value "safe", then a respective counter is set to "0". This value is incremented after every image (i.e. frame) as long as the corresponding variable has the value "safe" or "possible". For the evaluation of the second set of rules, the following variables are defined based on the counter values of these variables:

logo_on
logo_off
sound_break_z
image_break_z
image_fade_in_z
image_fade_out_z

The actual values of the respective counters corresponding to the variables are used for fuzzyfying.

For the observation of the audio type, the change from stereo to mono and vice versa is interesting. Therefore a respective counter is set to "0", otherwise incremented, for each change of the variable "stereotone" from "safe" to "unsafe" and vice versa. The value of this variable is fuzzyfied with the variable "mono_stereo".

The above functions form the basis for the detection of features in television signals. Particular features in television signals are in correlation with commercial interrupts and can be used for the detection. But most of those features can be described linguistically, but they cannot be defined exactly.

But it is possible with the help of fuzzy sets and fuzzy logic to model linguistic contexts. Methods exist in which outputs are calculated on the basis of input values before defined fuzzy sets and a prescribed amount of fuzzy rules. Such methods are often called "calculation of fuzzy interferences". Here such a method is used to provide a measure for the probability with which a respective feature is present so that in a second run a measure for the probability can be obtained whether a commercial is present or not. There already exist microcontrollers with the special architecture which are able to efficiently calculate fuzzy interferences.

FIGS. 10a and 10b show the flow chart of such a method for the calculation of fuzzy interferences. For the conversion of arbitrary input values to fuzzy values a linguistic variable is defined. For each variable different features or properties can be defined. Contrary to known systems, wherein a variable has a particular property or not, it is possible for linguistic variables to have properties with a different weight. The weight of a property or feature of a variable is given by a number of the interval [0,1]. The value 0 means that a variable does not possess this feature and 1 means that the variable completely possesses the feature, i.e., the probability is 1. Further a linguistic variable can have several properties at the same time. The conversion of values into features is performed via membership functions which map the domain of definition of the input values to the interval [0,1]. The use of membership functions onto input values is called fuzzyfing. For the sake of simplicity, membership functions are often used which have a trapezoidal form, wherein triangles and rectangular are also recognized as trapezoids. Trapezoidal functions on the interval [0,1], which map at least one value onto 1, can be defined by four values in the domain of arguments.

If the four values $x_1, \ldots x_4$ for a membership function are given, then the membership value z for a given value x can be calculated as follows:

$$z = 0 : x \mu x_1 \text{ or } x \cdot x_4,$$

$$z = 1 : x \cdot x_2 \text{ and } x \mu x_3.$$

$$z = (x - x_1)^\cdot (x_2 - x_1) : x > x_1 \text{ or } x < x_2$$

$$z = (x - x_3)^\cdot (x_4 - x_3) : x > x_3 \text{ or } x < x_4$$

The calculation of the membership values is performed in step 1013 with the function "fuzzy". A linguistic variable is defined by its name, the domain of arguments of the membership functions, a set of features and the membership function for each feature, given by four values. Even internal and output variables of fuzzy systems are specified in this way. The variables used in this method are given in the appendix.

With the help of linguistic variables rules can be formulated, wherein a rule has to following form:

If [condition] then variable_x=feature_y

A condition has the form (BNF-notation):
[not] variable_a is feature_b[{and°or} condition].

For the calculation of fuzzy interferences all the rules concerning one part of the same variable are collected, step 1003. In the steps 1006–1021, the values for the condition of a rule are calculated. Therefore, the input values for every variable existing in the condition are fuzzyfied with the help of a membership function according to the above feature (step 1003). After fuzzyfying, the operators "and", "or" or "not" are applied on the fuzzy values of the single variables (steps 1016–1021). Therein the operators are defined as follows:

a and b:<=>minimum (a,b)
a or b:<=>maximum (a,b)
not a:<=>1−a

The result is the fuzzy value of the condition. The steps 1006–1026 are applied for all rules, respectively, which have the same right-side variables. A features is assigned to the right-side variable of one rule. The area and the moment of the membership function are multiplied with the fuzzy value of the condition in steps 1022–1024. The area and the momentum of the membership functions defined by $x_1, \ldots x_4$, are calculated as follows:

$$\text{area:} = (x_2 - x_1)/2 + (x_3 - x_2) + (x_4 - x_3)/2$$

$$\text{momentum:} = (x_2 - x_1)/2 * (x_1 + (x_2 - x_1) * 2/3) + (x_3^2 - x_2^2/2 + (x_4 - x_3)/2 * (x_3 + (x_4 - x_3)/3).$$

In steps 1027–1029 the values of all rules with the same variables on the right side are summed up. The division of the momentum sum and the area sum results in the overall value of a variable (step 1030). This method is repeated for all variables, which occurs on the right side of rules (step 1032).

Appendix A: linguistic variables
The linguistic variables with the respective features and their measured functions are listed. The used number values are either of typ float or frames. Numbers of the type frames are written in the following format:

mmm:ss:ff (minutes:seconds:frames)

Leading zeros are not explicitely shown: for example: ::30 instead of 000:00:30.

The format for the definition of linguistic variables is in BNF notation:
linguistic_variable :=variable_name domain:type
 {proper_name: function_definition}
domain :=[number,{number°_}]
function_definition:=number/number/number/number
type :=float°frames
 Input variables:

stereotone_pilot [0,1]: float
on: 0/0/0/0
off: 1/1/1/1 stereotone_vps [0,1]: float
on: 0/0/0/0
off: 1/1/1/1 two_channel_pilot [0,1]: float
on: 0/0/0/0
off: 1/1/1/1 two_channel_vps [0,1]: float
on: 0/0/0/0
off: 1/1/1/1 vps_break [0,1]: float
on: 0/0/0/0
off: 1/1/1/1 vps_present [0,1]: float
on: 0/0/0/0
off: 1/1/1/1 channel_differenz [0,1]: float
clear: 0/0/0,1/0,12
small: 0,1/0,12/0,2/0,25
medium: 0,2/0,25/1/1 sound_level [0,1]: float
very_soft: 0/0/0,1/0,12
soft: 0/0,2/0,3/0,4
medium: 0,25/0,4/0,6/0,75
loud: 0,6/0,7/0,8/1
very_loud: 0,88/0,9/1/1 sound_decrease [0,_]: frames
very_short: 0/0/::25/::49
short: ::25/:1:00/:5:00/:10:00
medium: :4:00/:8:00/1:0:00/3:0:00
long: 1:0:00/3:0:00/_/_ sound_increase [0,_]: frames
very_short: 0/0/::25/::49
short: ::25/:1:00/:5:00/:10:00
medium: :4:00/:8:00/1:0:00/3:0:00
long: 1:0:00/3:0:00/_/sound_ sound_constant [0,_]: frames
very_short: 0/0/::25/::49
short: ::25/:1:00/:5:00/:10:00
medium: :4:00/:8:00/ 1:0:00/3:0:00
long: 1:0:00/3:0:00/_/_ image_difference [0,1]: float
clear: 0/0/0/0
medium: 0.1/0.25/0.7/0.75
small: 0.7/0.75/1/1 brightness [0,1]: float
very_bright: 0/0/0.05/0.1
bright: 0.05/0.15/0.3/0.5
medium: 0.25/0.35/0.65/0.75
dark:0.5/0.7/0.85/0.95
very_dark: 0.9/0.95/1/1 brightness_decrease [0,_]: frames
very_short: 0/0/::05/::10
short: ::05/::10/:20:/:1:00
medium: :0:20/:1:00/:2:00/:3:00
long: 0:2:00/0:4:00/_/_ brightness_increase [0,_]: frames
very_short: 0/0/::05/::10
short: ::05/::10/:20:/:1:00
medium: :0:20/:1:00/:2:00/:3:00
long: 0:2:00/0:4:00/_/_ brightness_constant [,_]: frames
very_short: 0/0/::05/::10
short: ::05/::10/:20:/:1:00
medium: :0:20/:1:00/:2:00/:3:00
long: 0:2:00/0:4:00/_/_ brightness_variance [0,1]: float
very_bright: 0/0/0.05/0.1
bright: 0.05/0.15/0.3/0.5
medium: 0.25//0.35/0.65/0.75
dark: 0.5/0.7/0.85/0.95
very_dark: 0.9/0.95/1/1 color_variance [0,1]: float
very_bright: 0/0/0.05/0.1
bright: 0.05/0.15/0.3/0.5
medium: 0.25/0.35/0.65/0.75
dark:0.5/0.7/0.85/0.95
very_dark: 0.9/0.95/1/1 logo_differenz [0,1]: float
small: 0/0/0.25/0.5
medium: 0.2/0.3/0.7/0.8
big: 0.5/0.75/1/1 logo_fade_out [0,_]: frames
very short: 0/0/::05/::10
short: ::05/::10/:20:/:1:00
medium: :0:20/:1:00/:2:00/:3:00
long: 0:2:00/0:4:00/_/_ logo_fade_in [0,_: frames
very_short: 0/0/::05/::10
short: ::05/::10/:20:/:1:00
medium: :2:20/:1:00/:2:00/:3:00
long: 0:2:00/0:4:00/_/_ logo_constant [0,_]: frames
very_short: 0/0/::05/::10
short: ::05/::10/:20:/:1:00
medium: :2:20/:1:00/:2:00/:3:00
long: 0:2:00/0:4:00/_/_

Variables for intermediate results stereotone [0,1]: float
safe: 0/0/0.1/0.25
possible: 0.1/0.25/0.75/0.9
unsafe: 0.75/0.9/1/1 two_channel [0,1]: float
safe: 0/0/0.1/0.25
possible: 0.1/0.25/6.75/0.9
unsafe: 0.75/0.9/1/1 black_image [0,1]: float
safe: 0/0/0.1/0.25
possible: 0.1/0.25/0.75/0.9
unsafe: 0.75/0.9/1/1 sound_cut [0,1]: float
safe: 0/0/0.1/0.25
possible: 0.1/0.25/0.75/0.9
unsafe: 0.75/0.9/1/1 sound_fade_in [0,1]: float
safe: 0/0/0.1/0.25
possible: 0.1/0.25/0.75/0.9
unsafe: 0.75/0.9/1/1 sound_fade_out [0,1]: float
safe: 0/0/0.1/0.25
possible: 0.1/0.25/0.75/0.9
unsafe: 0.75/0.9/1/1 sound_break [0,1]: float
safe: 0/0/0.1/0.25
possible: 0.1/0.25/0.75/0.9
unsafe: 0.75/0.9/1/1 image_cut [0,1]: float
safe: 0/0/0.1/0.25
possible: 0.1/0.25/0.75/0.9
unsafe: 0.75/0.9/1/1 image_fade-out [0,1]: float
safe: 0/0/0.1/0.25
possible: 0.1/0.25/0.75/0.9
unsafe: 0.75/0.9/1/1 image_fade_in [0,1]: float safe: 0/0/0.1/0.25
possible: 0.1/0.25/0.75/0.9
unsafe: 0.75/0.9/1/1
logo_fade_in [0,1]: float
safe: 0/0/0.1/0.25
possible: 0.1/0.25/0.75/0.9
unsafe: 0.75/0.9/1/1 logo_fade_out [0,1]: float
safe: 0/0/0.1/0.25
possible: 0.1/0.25/0.75/0.9
unsafe: 0.75/0.9/1/1 logo_off [0,_]: frames
now: ::0/::0/..3/::10
short: ::5/:1:05/:3:15/:5:0
medium: :4:0/:5:5/:40:0/2:4:0
long: 1:20:0/2:0:0/_/_ logo_on [0,_]: frames
now: ::0/::0/..3/::20
short: ::10/:54:0/:39:3/2:0:0
medium: 1:40:0/8:0:0/12:0:0/15:0:0
long: 10:0:0/16:31:5/_/_ mono_stereo: [0,1]: float
now: 1/1/1/1 image_break_z [0,_]: frames
now: ::0/::0/::3/::10
short: ::8/::20/:1:7/:4:0
long: :1:15/:20:0/:27:17/:34:0
very_long: :30:0/:40:0/:59:24/1:0:0 sound_break_z [0,_]: frames
now: ::0/::0/::3/::10
short: ::8/::20/:1:7/:1:17
long: :1:12/:2:1/:10:0/:10:0 image_fade_in_z [0,_]: frames
now: ::0/::0/::3/::12
short: ::6/::20/:1:7/:2:0
long: :1:12/:2:1/:10:0/:10:0 image_fade_out_z [0,_]: frames
now: ::0/::0/::3/::12
short: ::6/::20/:1:7/:2:0
long: :1:12/:2:1/:10:0/:10:0

Output variables:

commercials [0,1]: float
none 0/0/0.03/0.1
unlikely: 0.08/0.2/0.3/0.4
possible: 0.3/0.4/0.5/0.6
probable: 0.5/0.6/0.7/0.8
safe: 0.7/0.8/1/1

Appendix B: Fuzzy Rules
Using the linguistic variables of Appendix A, the following fuzzy rules can be defined:
First Set of Fuzzy Rules:
if ((stereotone_pilot is on) and (not channel_difference is small)) then stereotone :=safe;
if ((stereotone_pilot ist on) and (channel_difference is small)) then stereotone :=possible;
if ((stereotone_pilot ist off and (channel_difference is small)) then stereotone :=unsafe;
if ((stereotone_pilot ist off) and (channel_difference is clear)) then stereotone :=safe;
if ((stereotone_pilot ist off) and (channel_difference is medium)) then stereotone :=possible;
if ((stereotone_vps is on) and (not channel_difference is small)) then stereotone :=safe;
if ((stereotone_vps ist on) and (channel_difference is small)) then stereotone :=possible;
if ((stereotone_vps ist off) and (channel_difference is small)) then stereotone :=unsafe;
if ((stereotone_vps ist off and (channel_difference is clear)) then stereotone :=safe;
if ((stereotone_vps ist off) and (channel_difference is medium)) then stereotone :=possible;
if ((two_channel_pilot is on) and (not channel_difference is small)) then two_channel :=safe;
if ((two channel_pilot ist on) and (channel_difference is small)) then two_channel :=possible;
if ((two_channel_pilot ist off) and (channel_difference is small)) then two_channel :=unsafe;
if ((two_channel$_{13}$ pilot ist off) and (channel_difference is clear)) then two_channel :=safe;
if ((two_channel_pilot ist off) and (channel_difference is medium)) then two_channel :=possible;
if ((two_channel_vps is on) and (not channel_difference is small)) then two_channel:=safe;
if ((two_channel_vps ist on) and (channel_difference is small)) then two_channel :=possible;
if ((two_channel_vps ist off) and (channel_difference is small)) then two_channel :=unsafe;
if ((two_channel_vps ist off) and (channel_difference is clear)) then two_channel :=safe;
if ((two_channel_vps ist off) and (channel_difference is medium)) then two_channel :=possible;
if ((brightness is very_dark) and (brightness_variance is very_large)) then black_image :=safe;
if (((brightness is very_dark) or (brightness is dark)) and (brightness_variance is very_large))) then black_image :=safe;
if ((brightness is very_dark) and (brightness_variance is large)) then black_image :=possible;
if (((brightness is very_dark) or (brightness is dark)) and (brightness_variance is large))) then black_image :=possible;
if ((brightness is medium) and (brightness_variance is very_large)) then black_image :=possible;
if (((brightness is very_dark) or (brightness is dark)) and (brightness_variance is large))) then black_image :=possible;
if ((brightness_variance is medium) or (brightness_variance is small) or(brightness_variance is very_small) then black_image :=unsafe;
if (sound_increase is very_short) then sound_fade_in :=unsafe;
if (sound_increase is short) then sound_fade_in :=possible;
if (sound_increase is medium) then sound_fade_in :=safe;
if (sound_increase is long) then sound_fade_in :=possible;
if (sound_decrease is very short) then sound_fade_in :=unsafe;
if (sound_decrease is short) then sound_fade_in :=possible;
if (sound_decrease is medium) then sound_fade_in :=safe;
if (sound_decrease is long) then sound_fade_in :=possible;
if (not sound_level is very_soft) then sound_break:= unsafe;

if ((sound_level is very_soft) and (not sound_constant is very_short)) then sound_break:=safe;

if ((sound_level is soft) and (not sound_constant is very_short)) then sound_break:=possible;

if ((sound_level is very_soft) and ((sound_constant is medium) or (sound_constant is long) then sound_break:=safe;

if (image_difference is clear) then image_cut :=safe;

if ((image_difference is clear) or (image-difference is medium) then image_cut:=possible;

if (image_difference is small) then image_cut:=unsafe;

if (brightness_increase is very_short) then image_fade_in :=unsafe;

if (brightness_increase is short) then image_fade_in :=possible;

if (brightness_increase is medium) then image_fade_in :=safe;

if (brightness_increase is long) then image_fade_in :=possible;

if (brightness_decrease is very_short) then image_fade_in :=unsafe;

if (brightness_decrease is short) then image_fade_in :=possible;

if (brightness_decrease is medium) then image_fade_in :=safe;

if (brightness_decrease is long) then image_fade_in :=possible;

if (logo_increase is very_short) then logo_fade_in :=possible;

if ((logo_increase is short) or (logo_increase is medium) then logo_fade_in:=safe;

if (logo_increase is long) then logo_fade_in :=possible;

if (logo_decrease is very_short) then logo_fade_out :=possible;

if ((logo_decrease is short) or (logo_decrease is medium) then logo_fade_out:=safe;

if (logo_decrease is long) then logo_fade_out :=possible;

Second Set of Fuzzy Rules if (logo_off is now) and (sound_break_z is now) and (image_break_z is now) and (image_fade_in is possible) and (image_fade_in_z is now) then commercials :=safe;

if (logo_off is short) and (sound_break_z is now) and (image_break_z is now) and (image_fade in is possible) and (image_fade_in_z is now) then commercials :=safe;

if (logo_off is medium) and (sound_break_z is now) and (image_break_z is now) and (image_fade_in is possible) and (image_fade_in_z is now) then commercials :=safe;

if (logo_off is now) and (mono_stereo is now) then commercials:=possible;

if (logo_off is short) and (mono_stereo is now) then commercials:=possible;

if (logo_off is medium) and (mono_stereo is now) then commercials:=possible;

if (logo_off is now) and (image_fade_out is safe) and (image_fade_out_z is short) and (image_fade_in is possible) and (image_fade_in_z is now) then commercials:=probable;

if (logo_off is short) and (image_fade_out is safe) and (image_fade_out_z is short) and (image_fade_in is possible) and (image_fade_in_z is now) then commercials :=probable;

if (logo_off is now) and (sound_break_z is short) and (image_break_z is short) then commercials:=possible;

if (logo_off is short) and (sound_cut is long) and (sound_break_z is now) then commercials:=possible;

if (logo_off is medium) and (sound_cut is long) and (sound_break_z is now) then commercials:=possible;

if (logo_off is short) and (sound_cut is medium) and (sound_break_z is now) then commercials:=possible;

if (logo_off is medium) and (sound_cut is medium) and (sound_break_z is now) then commercials:=possible;

if (logo_off is medium) and (sound_cut is long) and (sound_break_z is now) and (image_break_z is now) then commercials:=safe;

if vps_present is on then commercials:=safe;

if (logo_off is short) and (image_cut is safe) and (image_fade_in is possible) and (sound_cut is safe) then commercials:=safe;

if (logo_off is short) and (image_cut is possible) and (image_fade_in is possible) and (sound_cut is safe) then commercials:=safe;

if (logo_off is medium) and (image_cut is safe) and (image_fade_in is possible) and (sound_cut is safe) then commercials:=safe;

if (logo_off is medium) and (image_cut is possible) and (image_fade_in is possible) and (sound_cut is possible) then commercials:=safe;

if (logo_off is long) and (image_cut is safe) and (image_fade_in is possible) and (sound_cut is safe) then commercials:=safe;

if (logo_off is long) and (image_cut is possible) and (image_fade_in is possible) and (sound_cut is possible) then commercials:=safe;

if (logo_on is now) then commercials:=none;

if (logo_on is short) then commercials:=none;

if (logo_on is medium) and (logo_off is large) then commercials :=none;

if (logo_on is long) the commercials:=none;

if (logo_off is long) and ((image_fade_in is safe) and (image_fade_in_z is now) then commercials:=unlikely;

if (logo_off is long) and ((image_fade_in is safe) and ((image_cut is unsafe) and (sound_cut is unsafe))) then commercials:=unlikely; if (logo_off is long) and ((image_fade_in is possible) and ((image_cut is unsafe) and (sound_cut is unsafe))) then commercials:=unlikely;

if (image_break is very_long) and (logo_off is long) then commercials:=unlikely;

if (two_channel is safe) then commercials:=none;

We claim:

1. Method for the classification of television signals, characterized by the following steps:

Defining a set of detectable features, each being characteristic of at least one property of said television signals;

Assigning a variable with a predetermined domain of arguments to each detectable feature;

Defining a predetermined functional domain for each detectable feature on said domain of arguments;

Defining a set of rule using said variables, wherein the evaluation of said set of rules results in a classification of said television signals;

Measuring said variables in said television signals for a predetermined time, and evaluating said rules using the measurement values of said variables to classify the content of the television signals.

2. Method according to claim 1, wherein the classification results are used for the detection of commercials in TV signals.

3. Method according to claim 1, wherein the classification is performed on a framewise basis.

4. Method according to claim 1 wherein said detectable features are derived from the audio and the video parts of the television signals.

5. Method according to claim 4, wherein the following audio features are used for the definition of the variables:

stereotone and two channel audio.

6. Method according to claim 5, wherein the stereotone feature is subdivided into stereotone indication via pilot signal stereotone indication via VPS signal, and stereotone indication via level difference.

7. Method according to claim 5, wherein the two channel audio is subdivided into two channel indication via pilot signal two channel indication via VPS signal, and two channel indication via level difference.

8. Method according to claim 4, wherein the following features of the video signals can be analyzed with image processing:

distribution of brightness in one frame, color variance in one frame, measure of the difference of two successive frames, use of VPS information use of VPS break signal, and use of VPS code.

9. Method according to claim 1 wherein said variables used for the classification are linguistic variables.

10. Method according to claim 1 wherein the set of variables is a fuzzy set, and fuzzy logic is used in the evaluation of the set of rules.

11. Method according to claim 10, wherein the functional domain is formed by the interval [0,1].

12. Method according to claim 11, wherein the functions defined on the domain of arguments to achieve a fast evaluation of said set of rules are trapezoidal functions including triangles and rectangles.

13. Method according to claim 12, wherein said trapezoidal functions are characterized by four values $x_1, \ldots, x_4$, wherein $x_1$ being element of the domain of arguments and z being element of a [0,1], wherein $z=T(x)$ is computed as follows:

$z=0: x \mu x_1$ or $x_4$, $z=1: x \cdot x_2$ and $x \mu x_3$.

14. Method according to claim 1 wherein each rule out of the set of rules can be written in the following form:

If (condition) then variable_x: feature_y, wherein a condition is of the form:

(not) variable_a is feature_b [{and°or} condition].

15. Method according to claim 14, wherein the operators used in the rules are defined as follows:

a and b:=minimum (a,b)

a or b:=maximum (a,b)

not a:=1−a.

16. Method according to claim 12 wherein the area and the momentum of the above functions are multiplied by the fuzzy value of the condition, wherein the area and the momentum of the function defined by $x_1, \ldots x_4$ is computed as follows:

$$area := (x_2-x_1)/2 + (x_3=x_2) + (x_4-x_3)/2$$

$$momentum: = (x_2-x_1)/2*(x_1+(x_2-x_1)* \tfrac{2}{3}) + (x_3^2-x_2^2/2 + (x_4-x_3)/2*(x_3+(x_4-x_3)/3).$$

17. Method according to claim 1, wherein the classification is evaluated using the knowledge of present and past television signals, i.e. classification is performed in real time.

18. Method according to claim 17, wherein the knowledge of future television signals is also used for the evaluation of the set of rules, i.e., the classification is done using a recorded television signal.

19. Method according to claim 14 wherein the classification results are stored in a memory for future use.

20. Method according to claim 18, wherein a threshold value s is defined so that if the probability of the occurrence of a commercial is smaller than s, the data of the last 60 s are stored, and if the probability of the occurrence of the commercial is greater or equal to the threshold, the data are continuously stored until the occurrence of the commercials is smaller than the threshold for 90 s.

21. Method according to claim 20, wherein the values of the color variance, brightness variance, audio level and logogram similarity are compared at the start and the end of a data block.

22. Method according to claim 20, wherein the time intervals between the black images are detected in a data block of the television signals for the evaluation of the start and the end of a commercial.

* * * * *